(12) United States Patent
Won et al.

(10) Patent No.: US 10,420,190 B2
(45) Date of Patent: Sep. 17, 2019

(54) AUDIO APPARATUS, DRIVING METHOD FOR AUDIO APPARATUS, AND COMPUTER READABLE RECORDING MEDIUM

(71) Applicant: SAMSUNG ELECTRONICS CO., LTD., Suwon-si (KR)

(72) Inventors: Mi-youn Won, Seoul (KR); Won-min Choi, Seoul (KR); Jung-geun Kim, Suwon-si (KR); Ji-hyae Kim, Seoul (KR); Won-hee Lee, Seoul (KR); Chang-hoon Park, Seoul (KR); Se-ran Jeon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/383,515

(22) Filed: Dec. 19, 2016

(65) Prior Publication Data
US 2017/0181250 A1 Jun. 22, 2017

(30) Foreign Application Priority Data
Dec. 18, 2015 (KR) .................. 10-2015-0182052

(51) Int. Cl.
*H05B 37/02* (2006.01)
*H04R 1/02* (2006.01)
(Continued)

(52) U.S. Cl.
CPC ......... *H05B 37/0227* (2013.01); *H04R 1/028* (2013.01); *H04S 7/303* (2013.01);
(Continued)

(58) Field of Classification Search
CPC ............ H05B 37/0227; H05B 37/0236; H05B 37/0245; H05B 37/0272
(Continued)

(56) References Cited

U.S. PATENT DOCUMENTS 9,654,678 B1 * 5/2017 Fu ........................ H04N 5/2256
9,839,088 B1 * 12/2017 Deaton .............. H05B 33/0854
(Continued)

FOREIGN PATENT DOCUMENTS

| CN | 1801837 A | 7/2006 |
|---|---|---|
| CN | 1857756 A | 11/2006 |

(Continued)

OTHER PUBLICATIONS

Written Opinion dated Feb. 20, 2017 issued by International Searching Authority in counterpart International Application No. PCT/KR2016/014407 (PCT/ISA/237).
(Continued)

*Primary Examiner* — Tung X Le
(74) *Attorney, Agent, or Firm* — Sughrue Mion, PLLC

(57) ABSTRACT

An audio apparatus, a driving method thereof, and a computer readable recording medium are provided. The audio apparatus includes a lighting part configured to provide a lighting effect to at least one direction around the audio apparatus; a detector configured to detect a direction, with respect to the audio apparatus, of a person present in a vicinity of the audio apparatus, and detect a motion of the person; and a processor configured to control the lighting part to provide, to the detected direction, the lighting effect based on the detected motion.

18 Claims, 38 Drawing Sheets

(51) Int. Cl.
*H04S 7/00* (2006.01)
*G06F 3/0484* (2013.01)
*G06F 3/0488* (2013.01)

(52) U.S. Cl.
CPC ........... *H04S 7/40* (2013.01); *H05B 37/0236* (2013.01); *H05B 37/0272* (2013.01); *G06F 3/0484* (2013.01); *G06F 3/0488* (2013.01); *H04R 2430/01* (2013.01); *H04S 7/307* (2013.01); *H04S 2400/13* (2013.01); *Y02B 20/44* (2013.01)

(58) Field of Classification Search
USPC .................................................. 315/152, 307
See application file for complete search history.

(56) References Cited

U.S. PATENT DOCUMENTS

| | | | |
|---|---|---|---|
| 2004/0046795 A1* | 3/2004 | Josephson | G06F 3/011 715/764 |
| 2004/0116039 A1* | 6/2004 | Mueller | A63H 27/10 446/220 |
| 2010/0265090 A1 | 10/2010 | Bisset et al. | |
| 2011/0140635 A1 | 6/2011 | Kim | |
| 2014/0192513 A1 | 7/2014 | Yim et al. | |
| 2015/0201295 A1 | 7/2015 | Lau et al. | |
| 2015/0215691 A1 | 7/2015 | Carlsson et al. | |
| 2015/0245159 A1 | 8/2015 | Osman | |
| 2017/0105265 A1* | 4/2017 | Sadwick | A61N 5/0618 |
| 2017/0178465 A1* | 6/2017 | Lashina | G08B 1/08 |

FOREIGN PATENT DOCUMENTS

| | | |
|---|---|---|
| CN | 201689343 U | 12/2010 |
| CN | 104244531 A | 12/2014 |
| CN | 204168456 U | 2/2015 |
| KR | 10-0993299 B1 | 11/2010 |
| KR | 10-2011-0066606 A | 6/2011 |
| KR | 10-2013-0104185 A | 9/2013 |
| KR | 10-2014-0036950 A | 3/2014 |
| KR | 10-1381982 B1 | 4/2014 |
| KR | 10-1398820 B1 | 5/2014 |
| KR | 10-2014-0089286 A | 7/2014 |
| KR | 10-2014-0133682 A | 11/2014 |
| WO | 2014145978 A2 | 9/2014 |

OTHER PUBLICATIONS

International Search Report dated Feb. 20, 2017 issued by International Searching Authority in counterpart International Application No. PCT/KR2016/014407 (PCT/ISA/210).
Sony Corporation, "Sound So Loud You Can See It", Press Centre, Jul. 1, 2015, (6 pages total) http://presscentre.sony.co.uk/pressreleases/sound-so-loud-you-can-see-it-1187204.
Sony, "Home Audio System: Operating Instructions", MHC-V7D, 2015 Sony Corporation, Printed in China, 4-564-681-13(1), (64 Pages Total) http://pdf.crse.com/manuals/4564681131.pdf.
Communication dated Aug. 16, 2018, from the European Patent Office in counterpart European Application No. 16875978.5.
Communication dated Jul. 22, 2019, issued by the State Intellectual Property Office of P.R. China in counterpart Chinese Application No. 201680074030.4.

* cited by examiner

430

FIG. 8A
FIG. 8B
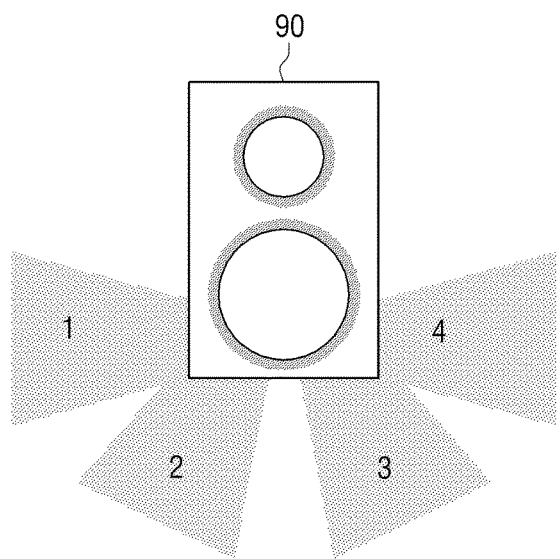
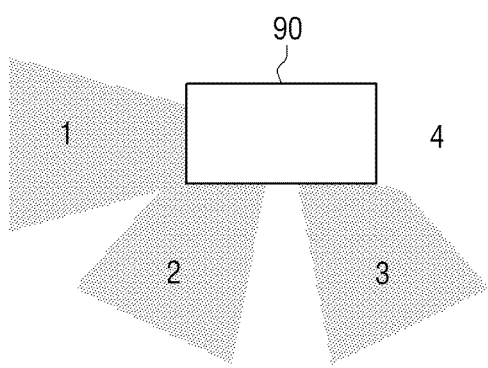

FIG. 9A
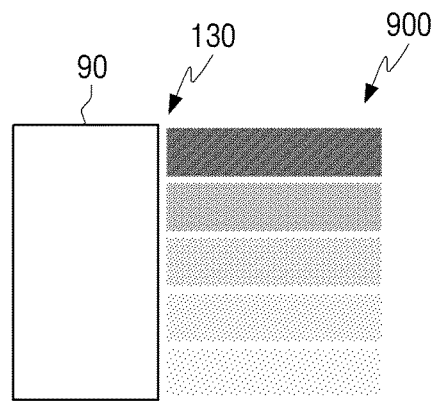
FIG. 9B
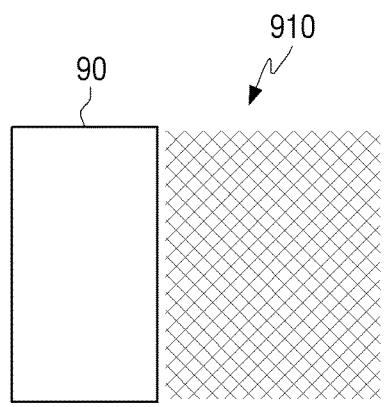
FIG. 9C  FIG. 9D  FIG. 9E
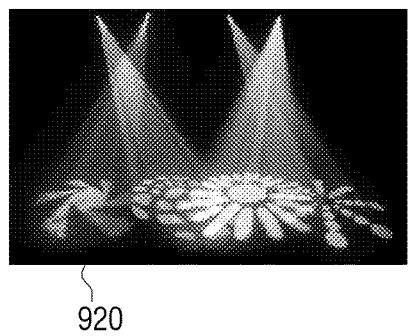
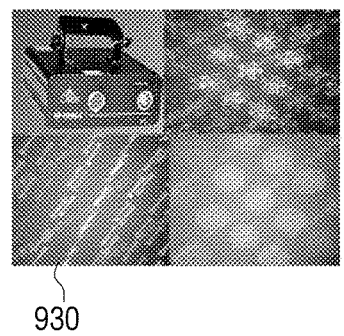
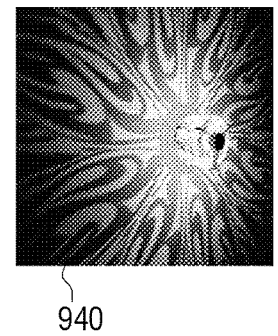

FIG. 11A
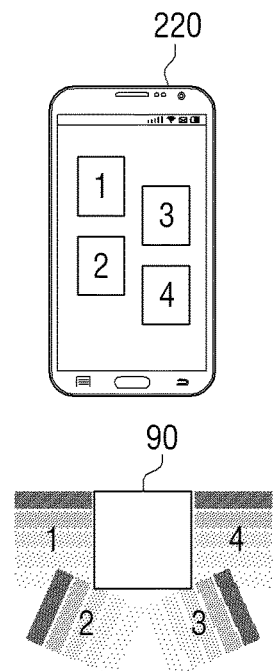
FIG. 11B
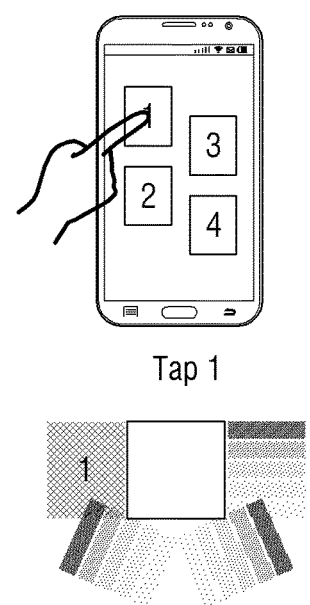
FIG. 11C
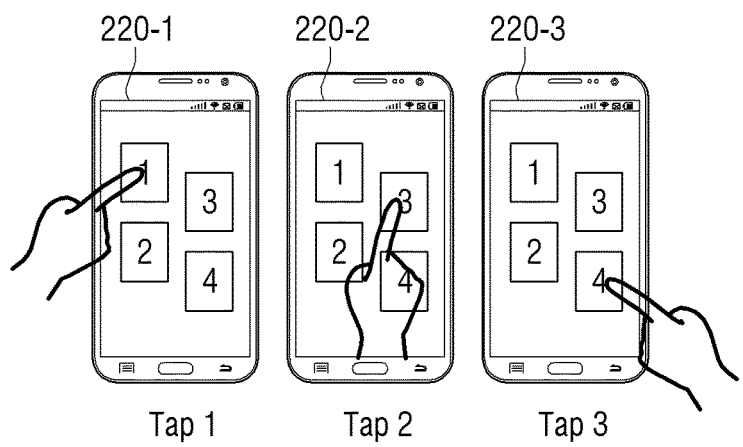
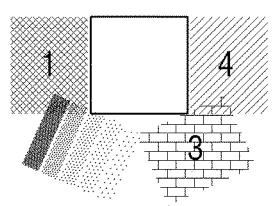

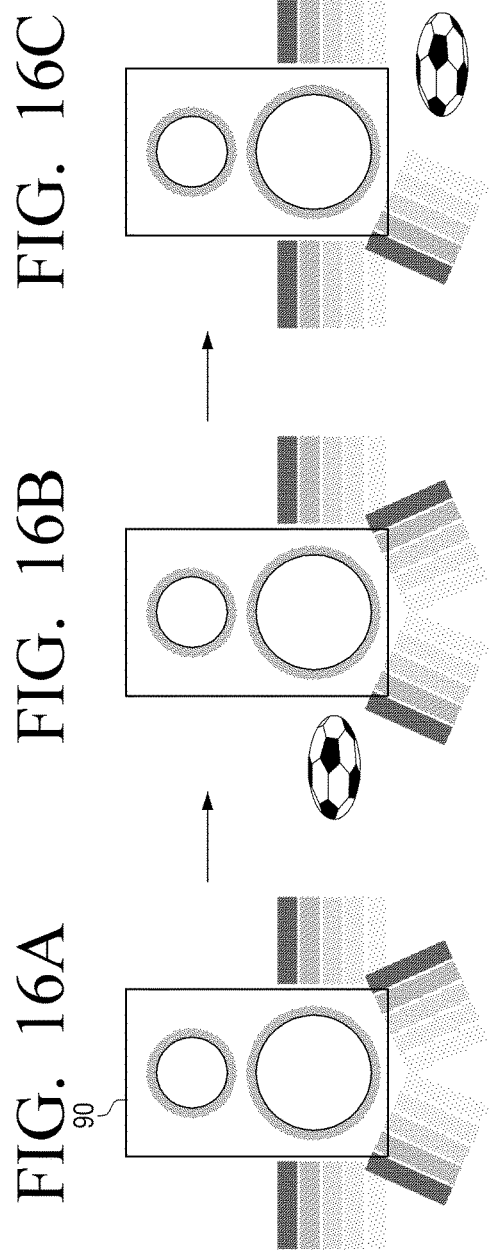
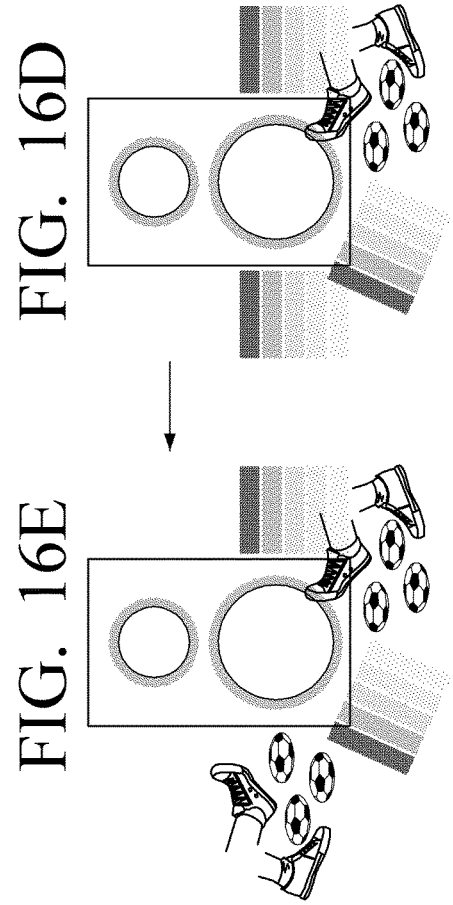

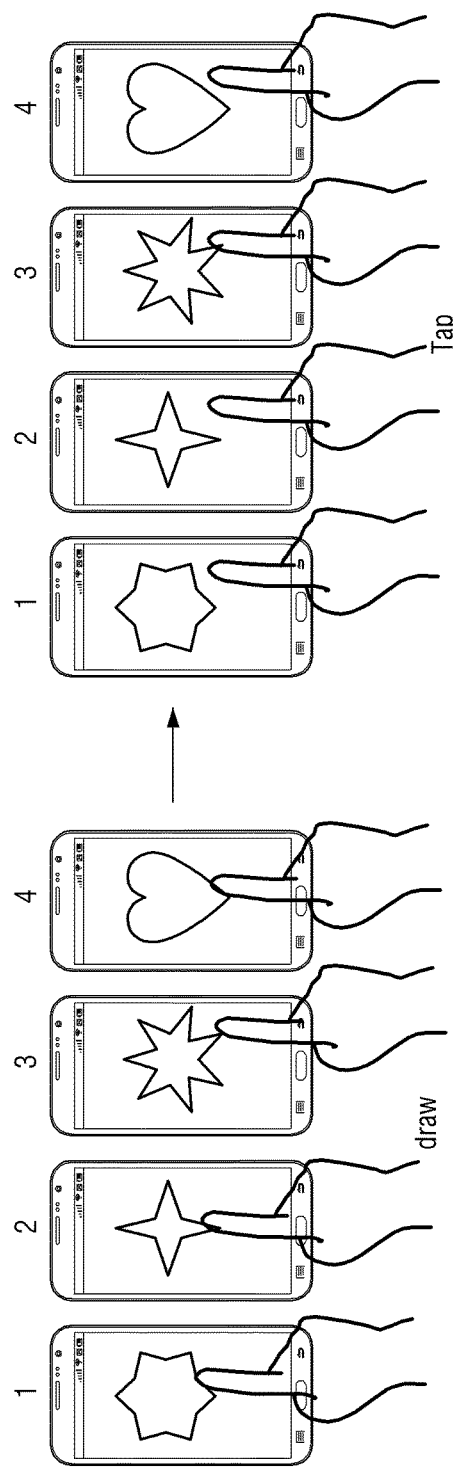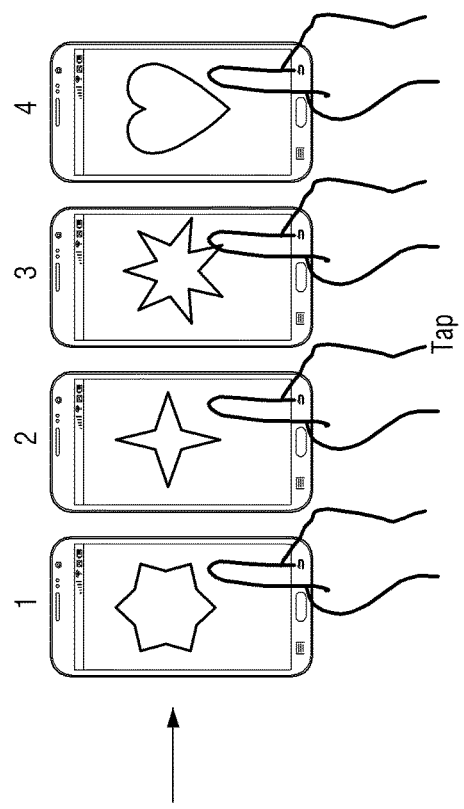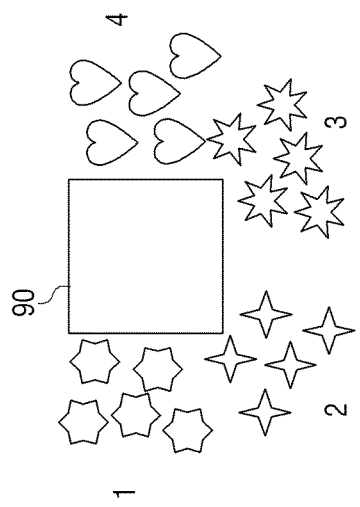

FIG. 20A
FIG. 20B
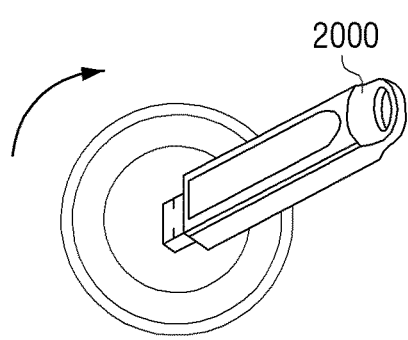
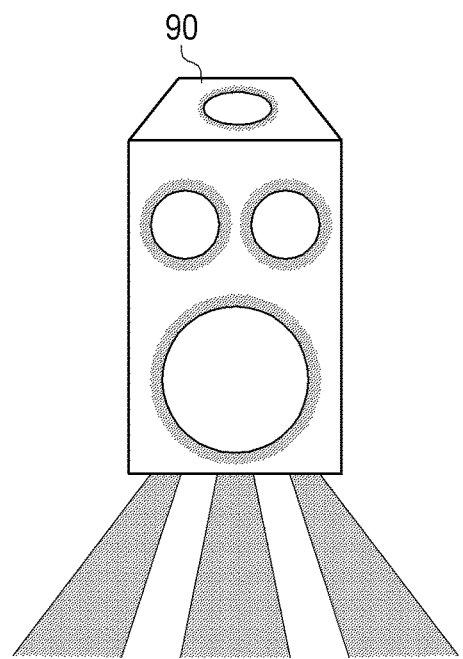

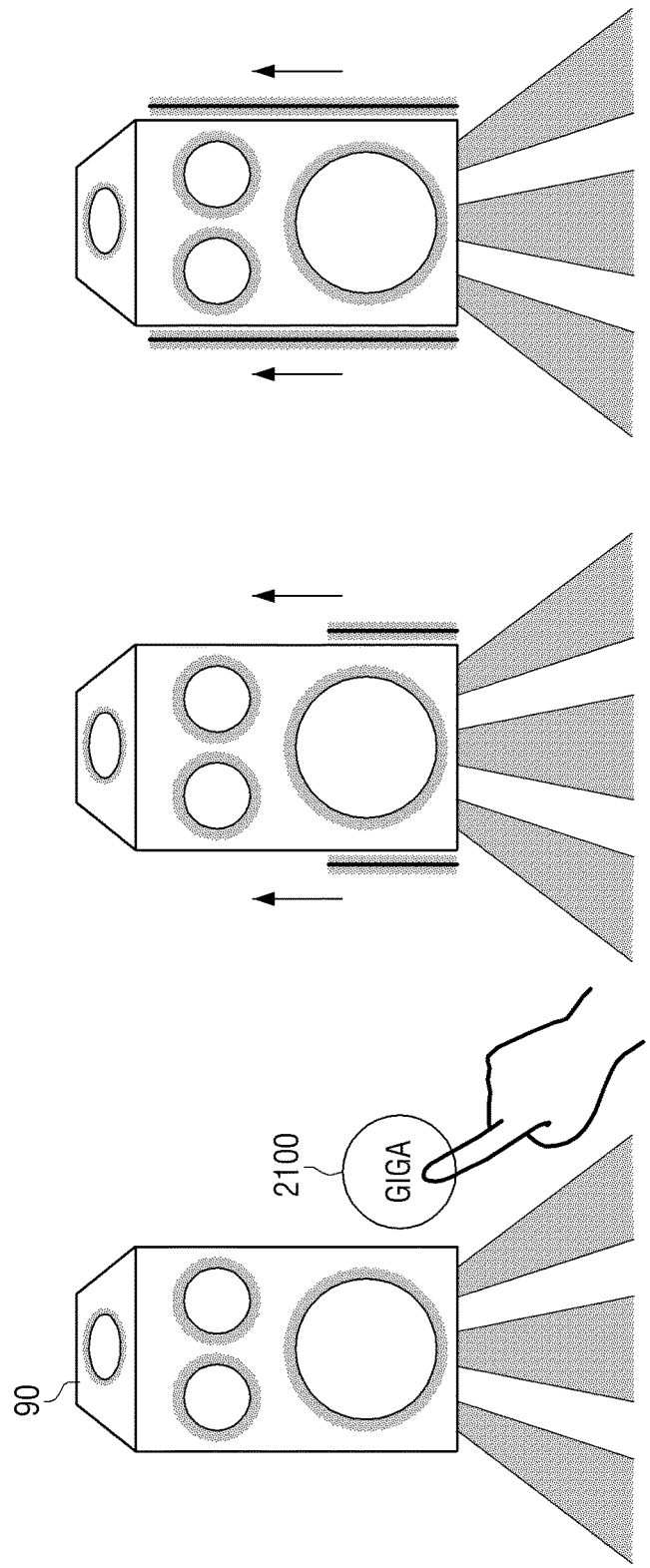

FIG. 24A
FIG. 24B
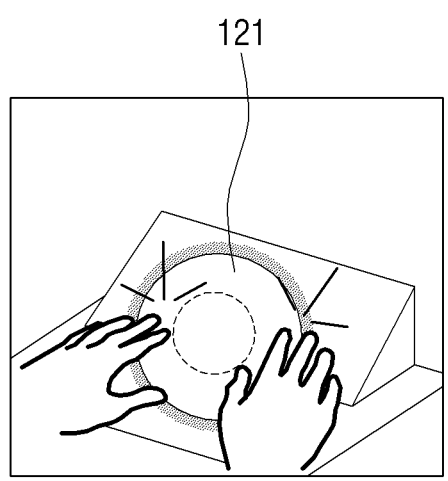
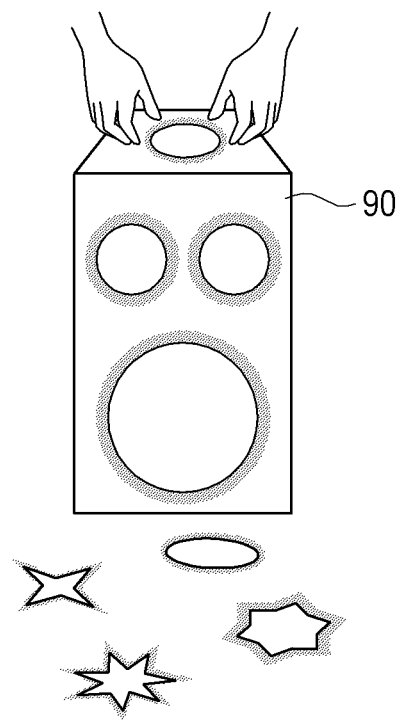

DEFAULT LIGHTING MODE

PERSON APPROACHES
PROVIDE GIGA SOUND / SPOTLIGHT

AUDIO APPARATUS, DRIVING METHOD FOR AUDIO APPARATUS, AND COMPUTER READABLE RECORDING MEDIUM

CROSS-REFERENCE TO RELATED APPLICATIONS

This application claims priority from Korean Patent Application No. 10-2015-0182052, filed in the Korean Intellectual Property Office on Dec. 18, 2015, the disclosure of which is incorporated herein by reference in its entirety.

BACKGROUND

1. Field

Methods and apparatuses consistent with exemplary embodiments relate to an audio apparatus and a driving method thereof, and more particularly, to an audio apparatus that maximizes a use environment surrounding the audio apparatus by easily detecting a user at a remote distance at a party, for example, a driving method thereof, and a computer readable recording medium.

2. Description of the Related Art

As a party culture has been developed in a specific cultural area, there is an increased demand for a function of outputting music through an audio apparatus including speakers and simultaneously providing a lighting effect from the audio apparatus and peripheral areas of the audio apparatus in addition to a function of providing a sound effect. To meet such demand, an audio apparatus, a speaker, etc. having such functions have been launched.

In the related art, a lighting within an audio apparatus only reacts to a volume of music played by a speaker and a user merely selects a color or a designated preset value related to shape of an effect through a controller of a main body or a mobile app to designate a color and shape of an effect.

However, when using a sound effect of a speaker and a lighting effect at a party area where a user is dancing around a wide area, the above conventional technique restricts place and space because a user has to go close to a speaker and change an effect using a controller in an upper portion of a main body of an audio apparatus.

SUMMARY

Aspects of the present disclosure are to address at least the above-mentioned problems and/or disadvantages and to provide at least the advantages described below. Accordingly, one or more exemplary embodiments provide an audio apparatus, a driving method for an audio apparatus, and a computer readable recording medium, which maximizes a use environment surrounding the audio apparatus by easily detecting a user at a remote distance, for example, at a party, etc.

According to an aspect of an exemplary embodiment, the audio apparatus may include a lighting part configured to provide a lighting effect to at least one direction from among a plurality of directions around the audio apparatus, a detector configured to detect a direction of a place where a user is located in a vicinity of the audio apparatus, and to detect a body motion of the user, and a processor configured to control the lighting part to provide, to the detected direction, a lighting effect corresponding to the detected body motion.

The detector may include at least one of a proximity sensor, a vibration sensor, a microphone and a camera.

The audio apparatus may further include an acoustic outputting part configured to provide sound effect, and the lighting part may provide a designated lighting effect corresponding to the sound effect.

The audio apparatus may further include a user interface configured to receive a user command to manually control the lighting effect, and the user interface may include a touch pad which receives the user command input through a plurality of sensing areas matched with each of the plurality of directions.

The audio apparatus may further include a communication interface configured to communicate with a mobile terminal device to receive a user command for manually controlling the lighting effect, and the communication interface may receive the user command input through a plurality of sensing areas matched with each of the plurality of directions on a screen of the mobile terminal device.

The processor may control the lighting part to provide a lighting effect selected on the screen of the mobile terminal device.

The communication interface may receive, from a plurality of mobile terminal apparatuses, a plurality of user commands for manually controlling the lighting effect, and The processor may control the lighting part to provide the lighting effect on the basis of the plurality of received user commands.

The detector may be detachable from the audio apparatus, and the audio apparatus may further include a user interface to which the detached detector is connected.

The audio apparatus may further include a spotlight part included in at least one direction of an upper portion of the audio apparatus, and the spotlight part provide spotlight to the detected user position.

According to an aspect of an exemplary embodiment, a method for driving an audio apparatus may include providing a lighting effect to at least one direction from among a plurality of directions around the audio apparatus, detecting a direction of a place where a user is located in a vicinity of the audio apparatus and detecting a body motion of the user, and controlling the lighting part to provide, to the detected direction, a lighting effect corresponding to the detected body motion.

The detecting may include detecting through at least one of a proximity sensor, a vibration sensor, a microphone and a camera.

The method may further include providing sound effect, and the providing the sound effect may include providing a designated lighting effect corresponding to the sound effect.

The method may further include receiving a user command to manually control the lighting effect, and the receiving the user command may include receiving the user command input through a plurality of sensing areas matched with each of the plurality of directions.

The method may further include communicating with a mobile terminal device to receive a user command for manually controlling the lighting effect, and the communicating may include receiving the user command input through a plurality of sensing areas matched with each of the plurality of directions on a screen of the mobile terminal device.

The controlling the lighting part to provide the lighting effect may include controlling to provide a lighting effect selected on the screen of the mobile terminal device.

The method may further include receiving, from a plurality of mobile terminal apparatuses, a plurality of user commands for manually controlling the lighting effect, and the controlling the lighting effect to provide the lighting effect may include controlling to provide the lighting effect on the basis of the plurality of received user commands.

The method may further include providing a spotlight to the detected user position through a spotlight part included in at least one direction of an upper portion of the audio apparatus.

According to an aspect of an exemplary embodiment, in a computer-readable recording medium including a program for executing a method for driving an audio apparatus, the method for driving the audio apparatus may include providing a lighting effect to at least one direction from among a plurality of directions around the audio apparatus, detecting a direction of a place where a user is located in a vicinity of the audio apparatus and detecting a body motion of the user, and controlling the lighting part to provide, to the detected direction, a lighting effect corresponding to the detected body motion.

According to an aspect of an exemplary embodiment, there is provide an audio apparatus, including: a lighting part configured to provide a lighting effect to at least one direction around the audio apparatus; a detector configured to detect a direction, with respect to the audio apparatus, of a person present in a vicinity of the audio apparatus, and detect a motion of the person; and a processor configured to control the lighting part to provide, to the detected direction, the lighting effect based on the detected motion.

The detector may include at least one of a proximity sensor, a vibration sensor, a microphone and a camera.

The apparatus may further include: an acoustic outputting part configured to provide sound effect, and the lighting part may provide a designated lighting effect corresponding to the sound effect.

The apparatus may further include a user interface configured to receive a user command to manually control the lighting part, and the user interface may include a touch pad configured to receive the user command input through a plurality of sensing areas on the user interface matched with a plurality of directions around the audio apparatus.

The apparatus may further include: a communication interface configured to communicate with a mobile terminal device and configured to receive a user command for manually controlling the lighting part, and the communication interface may be configured to receive the user command input through a plurality of sensing areas on a screen of the mobile terminal device matched with a plurality of directions around the audio apparatus.

The processor may be configured to control the lighting part to provide the lighting effect according to a lighting effect mode selected on the screen of the mobile terminal device.

The communication interface may be configured to receive, from a plurality of mobile terminal apparatuses, a plurality of user commands for manually controlling the lighting part, and the processor may be configured to control the lighting part to provide the lighting effect based on the plurality of received user commands.

The detector may be detachable from the audio apparatus, and the apparatus may further include a user interface to which the detached detector is connected.

The apparatus may further include a spotlight part included in the audio apparatus, and the spotlight part provides spotlight to the detected direction.

According to an aspect of an exemplary embodiment, there is provide a method for driving an audio apparatus, the method including: providing a lighting effect to at least one direction around the audio apparatus; detecting a direction, with respect to the audio apparatus, of a person present in a vicinity of the audio apparatus and detecting a motion of the person; and controlling the lighting part to provide, to the detected direction, the lighting effect based on the detected motion.

The detecting may include detecting using at least one of a proximity sensor, a vibration sensor, a microphone and a camera.

The method may further include: providing sound effect, and the controlling the lighting part may include providing a designated lighting effect corresponding to the sound effect.

The method may further include: receiving, via a user interface, a user command to manually control the lighting effect, and the receiving the user command may include receiving the user command input through a plurality of sensing areas provided on the user interface matched with a plurality of directions around the audio apparatus.

The method may further include: communicating, via a communication interface, with a mobile terminal device to receive a user command for manually controlling the lighting effect, and the communicating may include receiving the user command input through a plurality of sensing areas provided on a screen of the mobile terminal device matched with a plurality of directions around the audio apparatus.

The controlling the lighting part to provide the lighting effect may include controlling to provide the lighting effect according to a lighting effect mode selected on the screen of the mobile terminal device.

The method may further include: receiving, from a plurality of mobile terminal apparatuses, a plurality of user commands for manually controlling the lighting effect, the controlling the lighting effect to provide the lighting effect may include controlling to provide the lighting effect based on the plurality of received user commands.

The method may further include: providing, via a spotlight part, a spotlight to the detected direction, the spotlight part included in the audio apparatus.

According to an aspect of an exemplary embodiment, in a computer-readable recording medium including a program for executing a method for driving an audio apparatus, the method for driving the audio apparatus may include: providing a lighting effect to at least one direction around the audio apparatus; detecting a direction, with respect to the audio apparatus, of a person present in a vicinity of the audio apparatus and detecting a motion of the person; and controlling the lighting part to provide, to the detected direction, the lighting effect based on the detected motion.

According to an aspect of an exemplary embodiment, there is provide an audio apparatus, including: a lighting part configured to provide a lighting effect to at least one direction around the audio apparatus; a detector provided on the audio apparatus and configured to detect a signal; a storage implemented by memory and configured to store control information used for controlling sound and lighting effect of the audio apparatus; a use environment adjusting unit configured to analyze the detected signal and provide an analysis result based on the analyzed detected signal; and a controller implemented by at least one hardware processor and configured to retrieve the control information from the storage based on the analysis result provided from the use environment adjusting unit. The controller may be configured to control the lighting part based on the retrieved control information.

The apparatus may further include: an acoustic outputting part configured to provide the sound effect, and the controller may be configured to control the acoustic outputting part based on the retrieved control information.

The lighting part is configured to provide a designated lighting effect corresponding to the sound effect.

The apparatus may further include: a communication interface configured to communicate with a mobile terminal and configured to receive a user command for manually controlling the lighting part, and the communication interface may be configured to receive the user command input through a plurality of sensing areas on a screen of the mobile terminal matched with a plurality of directions around the audio apparatus.

BRIEF DESCRIPTION OF THE DRAWINGS

The above and/or other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which:

FIGS. 8A and 8B show a front view and upper side view of when sound and lighting is provided in an audio apparatus according to an exemplary embodiment;

FIGS. 9A-9E are views provided to illustrate various lighting effects according to exemplary embodiments;

FIGS. 11A-11C, 12A-12D and 13A-13D are views provided to illustrate sound and lighting effects of an audio apparatus using the mobile terminal apparatus illustrated in FIG. 6C according to music genre;

FIGS. 16A-16E are views provided to illustrate acoustic and lighting effects of an audio apparatus when a soccer mode is set in FIG. 7C according to an exemplary embodiment;

FIGS. 17A-17F are views provided to illustrate a lighting control mode using a mobile terminal apparatus when a drawing mode is selected in FIG. 7C according to an exemplary embodiment;

FIGS. 20A and 20B are views illustrating a lighting effect in a state where a storage medium is connected according to an exemplary embodiment;

FIGS. 21A-21C are views provided to illustrate acoustic and lighting effects in response to selection of a function execution button according to an exemplary embodiment;

FIGS. 24A and 24B are views provided to illustrate acoustic and lighting effects using a touchpad according to an exemplary embodiment;

DETAILED DESCRIPTION

The exemplary embodiments may be variously modified and have several forms. Therefore, specific exemplary embodiments of the present disclosure will be illustrated in the accompanying drawings and be described in detail in the present specification. However, it is to be understood that the terms such as "include" or "configured" in the present disclosure do not limit features, numerals, and a scope of an exemplary embodiment described in the present specification, but includes all modifications, equivalents, and substitutions without departing from the scope and spirit of the present disclosure. When it is decided that the detailed description of the known art related to the present disclosure may obscure the gist of the present disclosure, a detailed description therefore will be omitted.

Terms used in the present specification are used only in order to describe specific exemplary embodiments rather than limiting the scope of the present disclosure. Singular forms are intended to include plural forms unless the context clearly indicates otherwise. It is to be understood that the present application specifies the presence of steps, operations, components, parts, or a combination thereof but does not preclude the presence or addition of one or more other features, numerals, steps, operations, components, parts, or a combination thereof.

In the exemplary embodiments, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented by at least one processor (not illustrated) except for a 'module' or a 'unit' that needs to be implemented by specific hardware.

Exemplary embodiments of the present disclosure are described in detail with reference to the accompanying drawings.

Figure 1A:
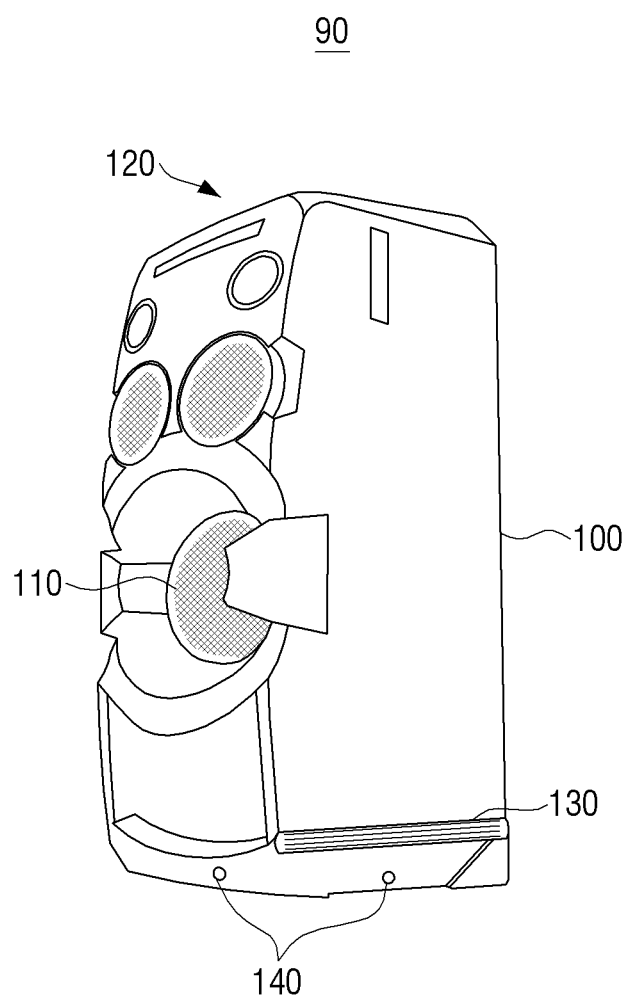
FIG. 1A is a view illustrating an audio apparatus, according to an exemplary embodiment.
Figure 1B:
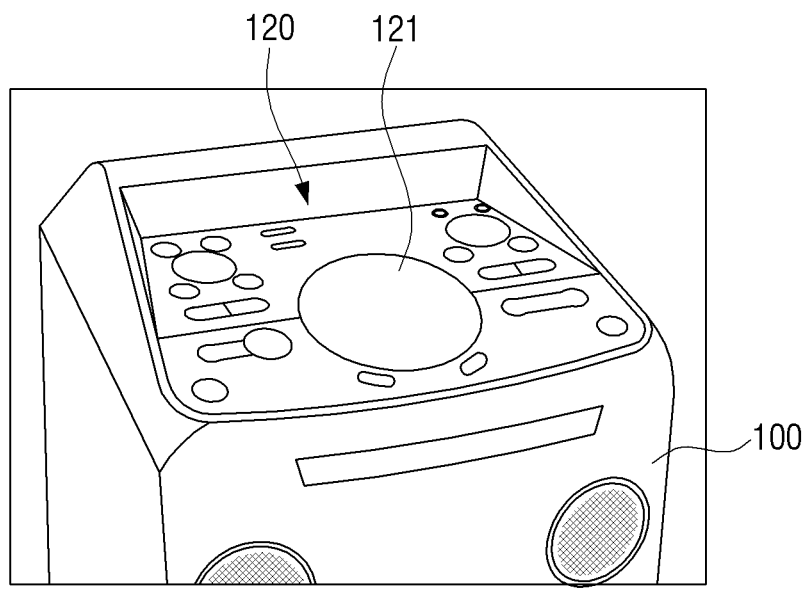
FIG. 1B is a view illustrating an upper end portion of the audio apparatus illustrated in FIG. 1 according to an exemplary embodiment.

FIG. 1A illustrates an audio apparatus 90 according to an exemplary embodiment of the present disclosure, and FIG. 1B illustrates an upper portion of the audio apparatus 90 of FIG. 1.

As illustrated in FIGS. 1A and 1B, according to an exemplary embodiment, an audio apparatus 90 may include all or some of a main body 100, an acoustic outputting part 110, a user interface 120, a lighting part 130, a detector 140, and a driver (not shown).

Herein, "include all or some of" refers to a configuration where the acoustic outputting part 110 or the user interface 120 may be omitted, etc. It will be described such that the audio apparatus 90 includes all of the components to help understanding of the present disclosure.

The main body 100 constitutes an external surface of the audio apparatus 90. That is, the main body 100 is an external framework of the audio apparatus 90.

The acoustic outputting part 110 may be included in a front surface part of the main body 100, and may output various forms of sounds under the control of the driver according to an exemplary embodiment. Such sound outputting form may have already been determined by a system designer prior to release of the audio apparatus 90. For example, the audio outputting part 110 may output different sound forms according to music genre, and may output different sound forms according to which operation/function is performed/selected by a user in vicinity of the audio apparatus 90 at, for example, a party. Other details will follow later.

The user interface 120 includes various interfaces for a user to perform an operation of the audio apparatus 90 (i.e., for a user to control an operation of the audio apparatus 90). For example, the user interface 120 may include various interface(s), such as a power button for turning on or off the audio apparatus 90, a volume control button (or lever), a music change button, etc., and may, according to an exemplary embodiment, further include a touchpad (or a drumpad) 121 for selecting acoustic effect or lighting effect. Herein, the touch pad/drumpad 121 is operated by repeated touch input, such as a drum.

Herein, the touchpad 121 is divided into a plurality of areas. The division is a division which is only recognizable by an apparatus (e.g., recognizable by coordinate information) rather than a physical division, and the audio apparatus 90 is to provide acoustic effect and/or lighting effect according to a touched area of the touch pad 121. For example, when a first area (e.g., a left area) and/or a second area (a right area) of the touchpad 121 is touched, the form of sound or lighting outputted from the audio apparatus 90 may vary. In the exemplary embodiment, the two areas on the touchpad 121 may also be simultaneously touched.

The lighting part 130 includes a lamp, such as an LED lighting device. For example, the LED lighting device may include a R, G and B diodes, thereby providing various colors. Further, the LED lighting devices may form an array in a matrix form, thereby outputting lighting in various patterns by control of a driver. This method may be similar to a method of expressing an image in an LED image display apparatus, but a filter with patterns, etc. may be used as well. According to an exemplary embodiment of the present disclosure, the lighting part 130 may be included in an upper (end) portion or a lower (end) portion of the audio apparatus 90, and if the main body 100 of the audio apparatus 90 has, for example, a rectangular shape, the lighting part 130 may be formed on four sides of the main body 100 of the audio apparatus 90. Such configuration of the lighting part 130 is not particularly limited and the number of the lighting part 130 and the locations of the lighting part 130 may be varied according to the design intent. Thus, an exemplary embodiment of the present disclosure will not be limited to a certain number of lighting parts 130 and a form of disposition of the lighting part 130 in the main body 100. However, such lighting part 130 may, as well as the above-described acoustic outputting part 110, output a particular form of lighting to a peripheral area of the audio apparatus 90 based on a user command input to the touchpad 121. Thereby, a use environment, that is, a surrounding atmosphere, of the audio apparatus 90 may be changed according to the lighting effect of the audio apparatus 90.

The lighting part 130, may, as well as the acoustic outputting part 110, be controlled by a remote controller to output various forms of sounds and lighting effects. For example, if a remote controller is a mobile terminal such as a smartphone, the mobile terminal may include an application to control the audio apparatus 90. When the corresponding application is executed, a shape such as the above touchpad may be displayed on a screen of the mobile terminal. In general, a mobile terminal includes a touch panel, and thus, it would be possible to perform such operation of the touchpad on the mobile terminal. Herein, the mobile terminal may be various peripheral devices, such as a cellular phone, a notebook PC, a tablet PC, TV, etc.

The detector 140 may include a proximity sensor, a vibration (or shock) sensor, a microphone, or etc. Such sensors may detect locations of attendees who are present around the audio apparatus 90 (e.g., detect attendees of a party where the audio apparatus 90 is provided), that is, the sensors may detect a direction of a place where the attendees are located, and/or detect a body movement of the attendees. For example, the vibration sensor may detect an impact force (or vibration) generated by the audio apparatus 90 placed on the floor or on a table at a party. For example, if the impact force sensed by the sensor is great, it is determined that an atmosphere of the party has been escalated. Thus, the audio apparatus 90 may output a suitable sound and lighting for such escalated atmosphere of the party. In addition, if a proximity sensor is installed at four directions (i.e., all four sides of the main body 110 having a rectangular shape), in response to a user being detected from one direction, a form of lighting outputted to the corresponding direction may be changed based on the detected user/attendee direction. A proximity sensor may determine a user/attendee of approaching by a light amount by using an optical sensor.

A microphone might be able to, further to detecting a direction and motion of a user, detect a more subtle user motion. In other words, the proximity sensor and the vibration sensor only determine whether a user/attendee is nearby or whether an impact is great or small, whereas the microphone acquires a real-time sound. Therefore, the audio apparatus 90, more accurately, a driver of the audio apparatus 90, may analyze sound acquired through a microphone to thereby predict what type of dance a user/attendee performs, or whether the user is eating, etc. To achieve this, the audio apparatus 90 may analyze a form (attribute) of sound. Herein, the "form of sound" refers to removing various mixed signals received through the microphone and analyzing an attribute of signal from the removed signal. For example, suppose that a sound "thump" is input and after a predetermined period elapses, the same sound is input. In this case, the audio apparatus 90 may determine that it is a jumping action of a user. In addition, if a first sound is "thump" and the second sound is "tap," the audio apparatus 90 may determine that a user's step changed from two feet to one foot (e.g., from "thump" to "tap").

However, the microphone may be configured as an individual apparatus in the form of a stand-alone form which is physically separated from the audio apparatus 90. Accordingly, the audio apparatus 90 may include a connector to connect with a microphone. Accordingly, it may be as well be possible to fix the audio apparatus 90 in an arbitrary place and to install a microphone which is an individual device at a party place to use the microphone.

In view of the practicality issues rather than the cost issues, the detector 140 may further include a photographing unit such as a camera. Accordingly, the driver of the audio apparatus 90 may analyze an image acquired through the photographing unit to more clearly determine motions of the attendees. According to the analysis result, the audio apparatus 90 may be able to control outputting of sound and lighting effect.

As described above, according to an exemplary embodiment, the detector 140 may be any sensor which is capable of detecting a user at a remote distance from the audio apparatus 90. Herein, the "remote distance" refers to a distance that is beyond a distance of the attendee from the audio apparatus 90 that is detectable by a proximity sensor, where the user does not feel inconvenient to be at a proximate distance to control an operation of the audio apparatus 90. However, the example is not limited thereto.

A driver (not shown) is included within the body 100. The driver is a circuit portion which controls the audio apparatus 90, and a print circuit board (PCB), etc. may include a controller and peripheral circuits thereof. As described above, the driver may control overall operations within the audio apparatus 90. For example, the driver may control an outputting form of the acoustic outputting part 110 and the lighting part 130 based on a signal detected by the detector 140. In the exemplary embodiment, in order to determine the outputting form of the detected signal, the driver may search for control information pre-stored in a memory, and output a form of sound and lighting effect based on the searched control information or modify the outputted form. Herein, the "control information" refers to information which indicates various forms of sound and lighting effect.

In addition, the audio apparatus 90 may further include a spotlight part (not shown) in an upper portion or in at least one direction. Thereby, a user may provide spotlight to a direction or a position to which a user/a person is detected.

According to an exemplary embodiment, the audio apparatus 90 may as well react to a clapping sound based on a sound provided by the user/attendee. Detailed explanation will be omitted herein because the description is not different from a stepping sound described above. However, the exemplary embodiment is not limited thereto because control of the audio apparatus 90, that is, turn on/off the apparatus, volume up/down, may be controlled based on sound.

According to an exemplary embodiment, the audio apparatus 90 may improve the inconvenience where a user(s) has to approach to the audio apparatus 90 to control sound and/or lighting every time, thereby maximizing a party spirit.

Figure 2:
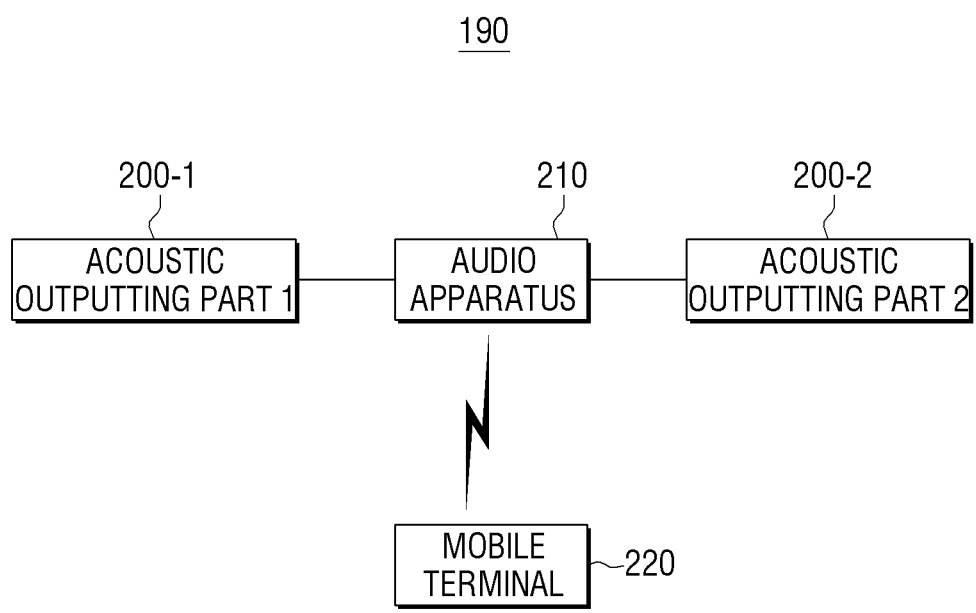
FIG. 2 is a view illustrating an audio system, according to an exemplary embodiment.

FIG. 2 is a view illustrating an audio system 190 according to an exemplary embodiment.

Compared with the audio apparatus 90 of FIG. 1, an audio system 190 illustrated in FIG. 2 is configured such that an audio apparatus 210, that is, an audio player/controller, is separated from an acoustic outputting part 1 200-1 and an acoustic outputting part 2 200-2.

When the audio apparatus 190 is a separated type as shown in FIG. 2, the acoustic outputting parts 1 and 2 200-1, 200-2 may be positioned in a user area (e.g., a dancing area). However, in some cases, the audio apparatus 210 may be also positioned in that area or positioned in a different area (e.g., in a separate location different from the dancing area). As such, various scenarios are possible.

Accordingly, in the audio system 190, the lighting part 130, the detector 140 may be included in the acoustic outputting parts 1 and 2 200-1, 200-2, or in the audio apparatus 210. Therefore, various types of products may be launched according to use.

For example, suppose that the acoustic outputting parts 1 and 2 200-1 and 200-2 are Bluetooth-based speakers. In this example, the user may interlock with a mobile terminal 220 to use the acoustic outputting parts 1 and 2 200-1, 200-2. Thus, it may be desirable that the lighting parts 130 and the detector 140 are included in the acoustic outputting parts 1 and 2 200-1, 200-2.

On the other hand, suppose that the acoustic outputting parts 1 and 2 200-1, 20-2 are fixed in a position with height. In this example, it may be desirable that the lighting part 130 and the detector 140 are included in the audio apparatus 210.

According to an exemplary embodiment, the mobile terminal 220, as described above, executes an application for controlling the audio apparatus 210 to control an output form of sound and/or lighting effects of the audio apparatus 210. In the exemplary embodiment, the two devices may communicate with each other using nearfield wireless communication such as Wi-Fi and Bluetooth.

Except for the above-described features, the acoustic outputting parts 1 and 2 200-1, 200-2, the audio apparatus 210 and the mobile terminal 220 of FIG. 2 are not greatly different from the audio apparatus 90 of FIG. 1. Thus, the detailed description will be omitted herein.

Hereinafter, an exemplary embodiment of the present disclosure will be described in greater detail based on the audio apparatus 90 of FIG. 1 for convenience of explanation.

Figure 3:
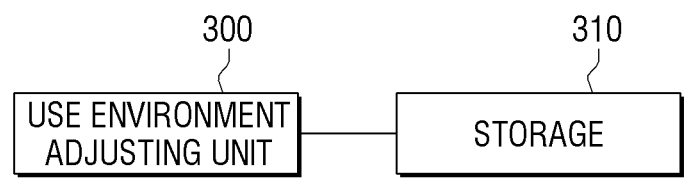
FIG. 3 is a block diagram illustrating a detailed structure of an audio apparatus according to an exemplary embodiment.

FIG. 3 is a block diagram exemplifying a detailed structure of the audio apparatus 90 illustrated in FIGS. 1A and 1B, supposing that the detector 140, the lighting part 130 and the acoustic outputting part 110 of FIGS. 1A and 1B each are individual devices which are connected to the audio apparatus (e.g. FIG. 2).

As illustrated in FIG. 3, according to an exemplary embodiment, the audio apparatus 90 includes all or some of a use environment adjusting unit 300 and a storage 310.

Herein, "include all or some of" refers to the fact that an element (e.g. storage 310) is integrated into the use environment adjusting unit 330. However, it will be described such that the audio apparatus 90 includes all the elements to help understanding of the present disclosure.

The use environment adjusting unit 300 receives a sensing signal related to an orientation and/or motion of a user/attendee who is present in a peripheral area of the audio apparatus 90. For example, a microphone may receive an audio signal indicating that a user/attendee is present near the audio apparatus 90. In the exemplary embodiment, the audio may include various sounds such as a voice signal uttered by a user, a clapping sound and a stepping sound. Such audio is used to determine, by the use environment adjusting unit 300, whether a recognized motion is a particular motion. For example, if the user utters "turn on the audio," the user may control an operation of the audio apparatus 90. In addition, if the user "claps" with hands, the user may turn on the audio apparatus 90. As such, the use environment adjusting unit 300 may receive various forms of audio signals and controls the audio apparatus 90 accordingly.

The use environment adjusting unit 300 may receive the aforementioned various audios, and analyze the received audio to determine a state of the user. For example, the use environment adjusting unit 300 may analyze a received signal to determine an attribute of the signal. Also, the use environment adjusting unit 300 may retrieve whether a storage 310 includes the same information as the determined signal, and if the storage includes the same signal as the determined signal, the use environment adjusting unit 300 acquires control information which matches the corresponding information from the storage 310. Herein, the "control information" is a signal which controls an outputting form of a sound and/or lighting effect of the audio apparatus 90. In the exemplary embodiment, the operation of determining an attribute of a signal may refer to finding an attribute point. For example, the use environment adjusting unit 300 may, if receiving a sound of a user shouting, find an attribute point of the received signal to identify whether it is shouting or not, setting aside obtaining a text-based recognition result using a user voice signal.

For example, the use environment adjusting unit 300 may, while an attendee is dancing in a peripheral area of the audio apparatus 90, in response to receiving an audio signal regarding whether the attendee is jumping on two feet, doing a kick, or etc., analyze a characteristic of the received signal to find the motion. Then, the use environment adjusting unit 300 retrieves whether information which matches the analysis result is pre-stored in the storage 310. Thereby, the use environment adjusting unit 300 may find control information corresponding to the analysis result. In fact, because control information stored in the storage 310 may be matched with various information and pre-stored, if the control information is matched with the analysis result, the retrieving process may be simplified. However, in the case of searching for a user motion that matches the analysis result and searching for control information again based on motion information of the searched motion, two retrieving process may be necessary.

The use environment adjusting unit 300, in response to control information being retrieved through the storage 310, control the acoustic outputting part 110 and the lighting part 130 based on the retrieved control information. For example, suppose that there is a sound and lighting that is fundamentally provided when the audio apparatus 90 is turned on. In the exemplary embodiment, the use environment adjusting unit 300 may change an outputting form of the sound and lighting effect based on the retrieved control information.

The storage 310 stores control information to be used for controlling sound and lighting effect. That is, the storage 310 provides guidelines to output sound and lighting effect when a user(s) is in a particular state in a peripheral area of the audio apparatus 90. In other words, the storage 310 stores control information which guides to output a sound and lighting in the form of A' in A situation, and to output sound and lighting in the form of B' in B situation. Such control information may have a form of a binary bit. Accordingly, the storage 310 may provide the stored control information according to a request from the use environment adjusting unit 300.

Figure 4:
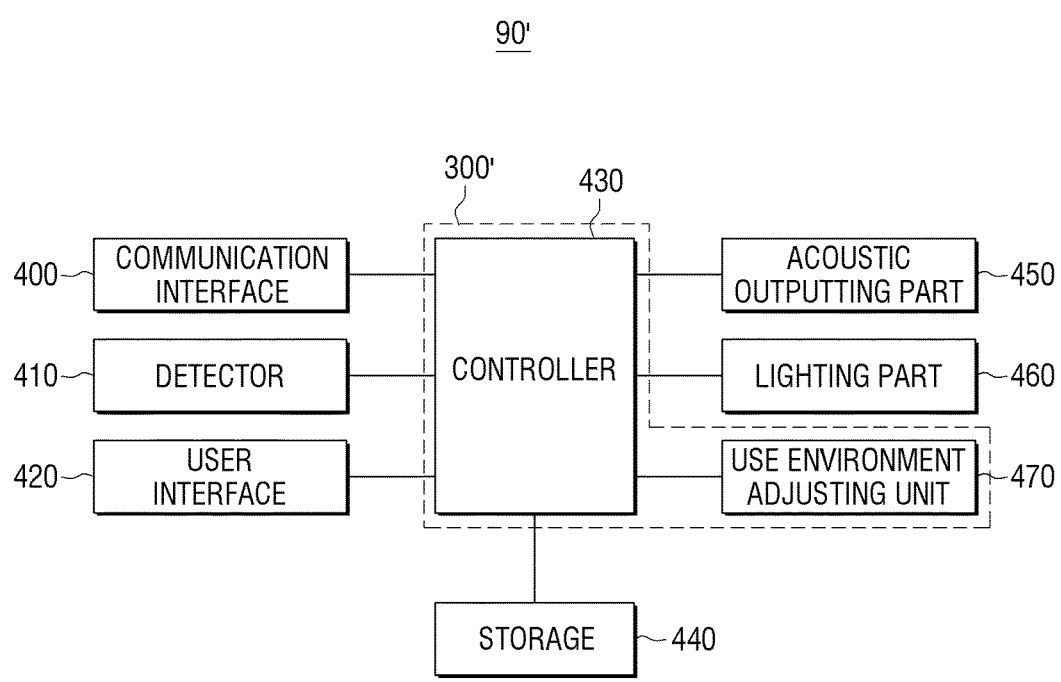
FIG. 4 is a block diagram illustrating a detailed structure of an audio apparatus according to an exemplary embodiment.
Figure 5:
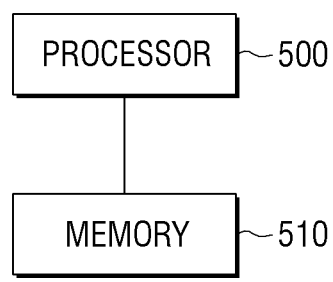
FIG. 5 is a view illustrating a structure of a controller of the audio apparatus illustrated in FIG. 4.

FIG. 4 is a block diagram illustrating a detailed structure of an audio apparatus 90' according to an exemplary embodiment, and FIG. 5 is a view illustrating an example of a structure of a controller of the audio apparatus 90' illustrated in FIG. 4.

As illustrated in FIG. 4, according to an exemplary embodiment of the present disclosure, an audio apparatus 90' includes all or some of a communication interface 400, a detector 410, a user interface 420, a controller 430, a storage 440, an acoustic outputting part 450, a lighting part 460, and a use environment adjusting unit 470.

Herein, "include all or some of" refers to the fact that the apparatus 90' is configured with some elements, such as the storage 440, the acoustic outputting part 450, the lighting part 460, etc. are omitted, or that the use environment adjusting unit 470 may be incorporated into another element such as the controller 430. Herein, it will be described such that the apparatus 90' include all the elements to help understanding of the present disclosure.

Compared with FIG. 1, the communication interface 400, the controller 430, the storage 440 and the use environment adjusting unit 470 illustrated in FIG. 4 may correspond to the driver of the audio apparatus 90.

The communication interface 400 may communicate with a mobile terminal 220, and transmit a control command received from the mobile terminal to the controller 430. The communication interface 400 may communicate with the mobile terminal 220 via nearfield wireless communication such as Wi-Fi, Bluetooth, etc., to communicate with the mobile terminal.

In addition, the communication interface 400 may communicate with a server (not shown) which provides a service such as voice recognition, etc. via a network managed by a telecommunication provider. For example, according to an exemplary embodiment of the present disclosure, if a sound and/or lighting of the audio apparatus 90' is controlled through voice recognition, the communication interface 400 may receive a recognition result provided from a server (e.g. text-based result), and transmit the result to the controller 430, setting aside the case of controlling switching on and off the audio apparatus 90' using voice recognition. Then, the controller 430 retrieves control information which matches with the recognition result in the storage 440 to control a sound outputting form of the acoustic outputting part 450 and a lighting outputting form of the lighting part 460 based on the retrieved control information.

The controller 430 is a Micom circuit, which may include a control circuit, a command interpreting part, a calculator (ALU), a register group, etc. It is already well known and thus, the detailed explanation will be omitted. However, compared with the use environment adjusting unit 300 of FIG. 3, the controller 430 is separated in hardware-wise to perform an overall control operation of the audio apparatus 90', and the use environment adjusting unit 470 plays a role of adjusting a surrounding atmosphere, that is, a use environment, of the audio apparatus 90'. The use environment adjusting unit 470 may analyze a received detection signal, for example, audio signal, to generate the analysis result. Then, the controller 430 may retrieve control information of the storage 440 based on the analysis result provided from the use environment adjusting unit 470.

As such, FIG. 4 illustrates that the controller 430 is physically separated from the use environment adjusting unit 470 to perform an operation in a binary manner, and thus may differ from FIG. 3 in which the use environment adjusting unit 300 may simultaneously perform a control function and a function of adjusting a surrounding atmosphere by, for example, executing a software (SW).

Except the above, the detector 410, the user interface 420, the acoustic outputting part 450 and the lighting part 460 illustrated in FIG. 4 are not significantly different from the acoustic outputting part 110, the user interface 120, the lighting part 130 and the detector 140 of FIG. 1, and the storage 440 of FIG. 4 is not significantly different from the storage 310 of FIG. 3. Thus, the detailed description will be omitted herein.

The controller 430 of FIG. 4 may include a hardware processor 500 and a memory 510 as illustrated in FIG. 5. In other words, the processor 500 of FIG. 5 may load a program stored in the use environment adjusting unit 470 of FIG. 4 to the memory 510 of FIG. 5 when the audio apparatus 90' is turned on. Then, the processor 500, to analyze a received audio signal, executes the program loaded onto the memory 510 and generates the analysis result. Then, the processor 500 may retrieve control information that matches with the generated analysis result in the storage 440 to control sound and/or lighting using the retrieved control information.

As such, the audio apparatus 90' does not control the use environment adjusting unit 470 as in FIG. 4 to analyze an audio signal, but executes a program stored in the internal memory 510, thereby further increasing data processing speed.

Figures 6A, 6B, 6C:
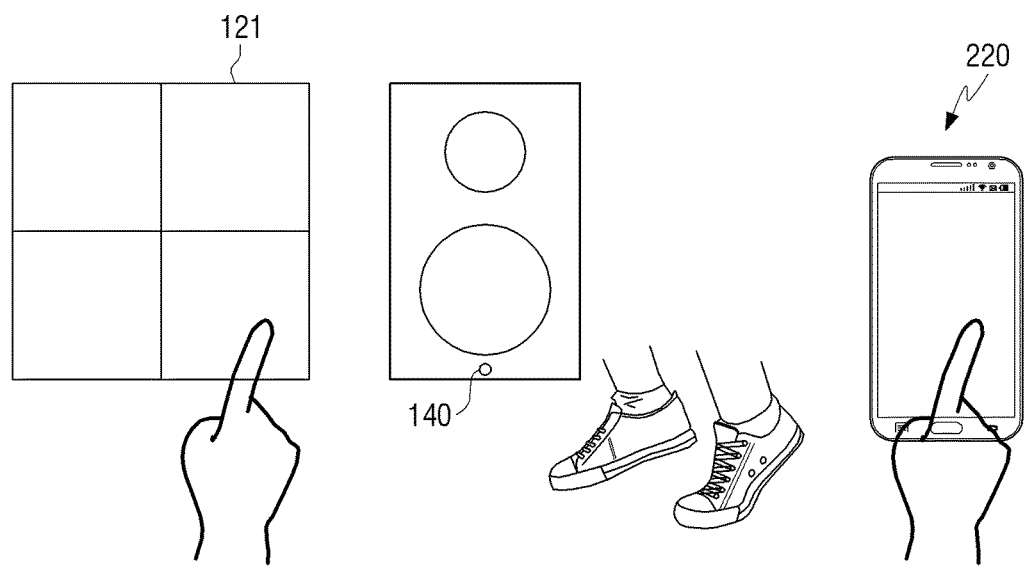
FIGS. 6A-6C are views provided to explain various user interfaces.
Figures 7A, 7B, 7C:
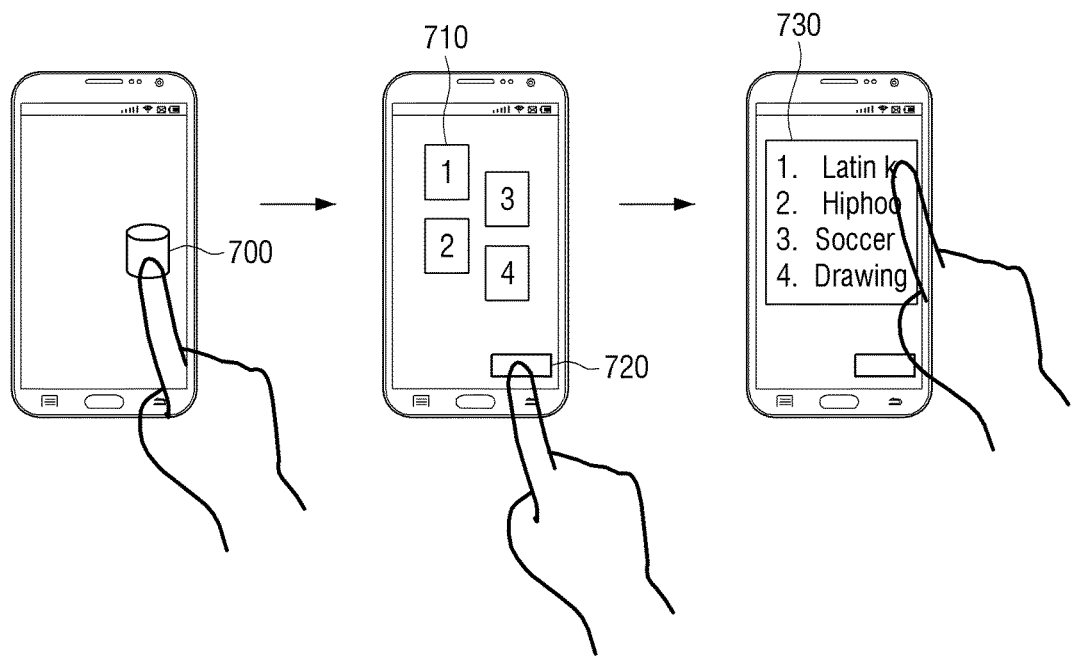
FIGS. 7A-7C shows an example of an interface process using the mobile terminal apparatus of FIGS. 6A-6C.

FIGS. 6A-6C are views provided to explain various user interface and FIGS. 7A-7C shows an example of an interface process using the mobile terminal apparatus of FIGS. 6A-6C.

According to an exemplary embodiment, a user of the audio apparatus 90 may control a surrounding atmosphere, that is, a use environment, of the audio apparatus 90 through a touchpad 121 as shown in FIG. 6A. The touchpad 121 has a plurality of detection areas. Accordingly, touching each area may produce different atmospheres. In addition, touching the same area of the touch pad 121 may produce different atmosphere depending on the selected operation mode of the audio apparatus 90. Further, the user may simultaneously touch two areas to produce sound and/or lighting effect accordingly.

In addition, a user of the audio apparatus 90 may control a surrounding atmosphere of the audio apparatus 90 by using the detector 140 which detects a user located near the audio apparatus 90 as shown in FIG. 6B. In other words, a motion of a user/attendee near the audio apparatus 90 is detected in various ways using at least one of an impact sensor, a proximity sensor, a microphone and a camera. Various atmosphere may be produced according to an analysis result of the detected signal. Here, the detector 140 may be detached from the audio apparatus 90 and may be connected to a user interface 120 (e.g., the touchpad 121).

In addition, a user of the audio apparatus 90 may produce a surrounding atmosphere of the audio apparatus 90 through a mobile terminal 220 as in FIG. 6C. For example, a user of the mobile terminal 220 may touch an icon 700 displayed on a main screen to access the audio apparatus 90 as in FIG. 7A. Then, a touchable area 710 may be displayed on a screen as in FIG. 7B and an operation mode button 720 may be displayed thereunder.

If the touchable area 710 is touched by a user, sound and/or lighting effect may be outputted according to a form of the sound and/or lighting effect that each area is matched. In other words, if a particular touchable area 710 is touched, information indicating that the corresponding area is touched is transmitted to the audio apparatus 90. Then, the audio apparatus 90 controls sound and lighting effect based on the received information.

However, if a user selects the operation mode button 720, the mobile terminal 220 may display a list 730 of selectable operation modes as in FIG. 7C. For example, a user can make a selection from the list 730 to output sound and lighting effect that is suitable for a music genre, to produce a lighting effect of a particular atmosphere by selecting a soccer mode, or to directly create a lighting effect with a particular atmosphere by selecting a drawing mode. Thereafter, additional auxiliary screens may be created, which, however, is well understood by the one of ordinary skill in the art and further description will thus be omitted.

FIGS. 8A and 8B show a front view and upper side view of an audio apparatus 90 when sound and lighting is provided in the audio apparatus 90 according to an exemplary embodiment.

When power is supplied, according to an exemplary embodiment, the audio apparatus 90 may output a basic lighting to four directions (e.g., areas) 1-4 as shown in FIG. 8A.

In the process, for example, if it is (automatically or by control of a user) determined that the user is absent to a particular direction (e.g., an area 4), the audio apparatus 90 may produce an atmosphere to output lighting in the other three directions (e.g., three areas) 1-3 only.

FIGS. 9A-9E are views provided to illustrate various lighting effects according to exemplary embodiments.

According to an exemplary embodiment, the audio apparatus 90 may, as shown in FIGS. 9A and 9B, express a mixed color by using a plurality of lamp lightings and lasers, and produce a lighting effect that has a pattern using movement of a filter and lighting.

In other words, the audio apparatus 90 may control each lighting part to produce lightings of different colors through a plurality of lightings as shown in FIG. 9A, and control the plurality of lightings to produce lighting that has the same color or shape as shown in FIG. 9B.

Further, the audio apparatus 90 may control, for example, R, G and B lamps, that is, LED devices, in the method as displaying an image on TV, thereby producing various forms of lightings as shown in FIGS. 9C-9E. In this example, light production may use an image control method; however, the lighting as shown in FIG. 9C-9E may be produced even using a filter, etc., and thus the examples are not limited to the above examples.

Figures 10A, 10B, 10C:
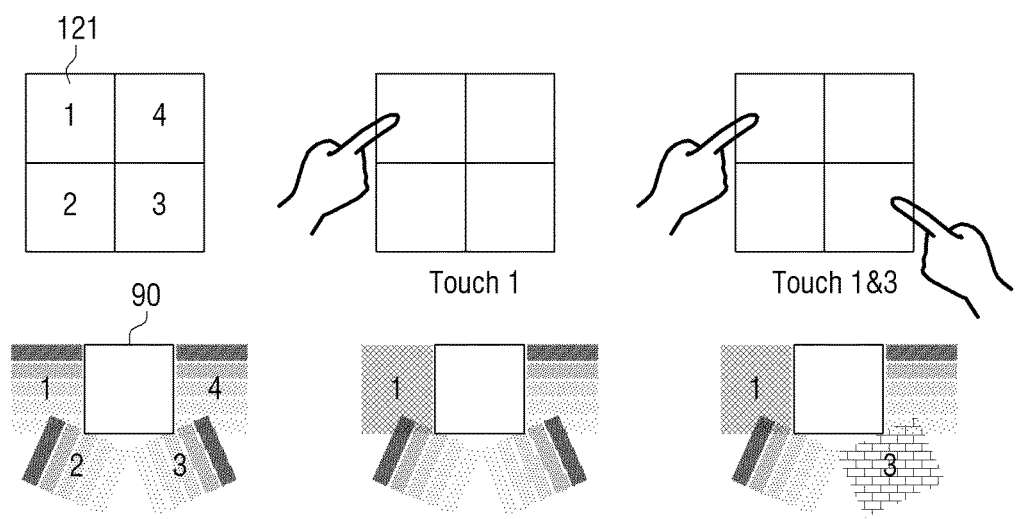
FIGS. 10A-10C are views provided to illustrate sound and lighting effects using the touchpad (or drumpad) illustrated in FIG. 6A.
Figure 12A:
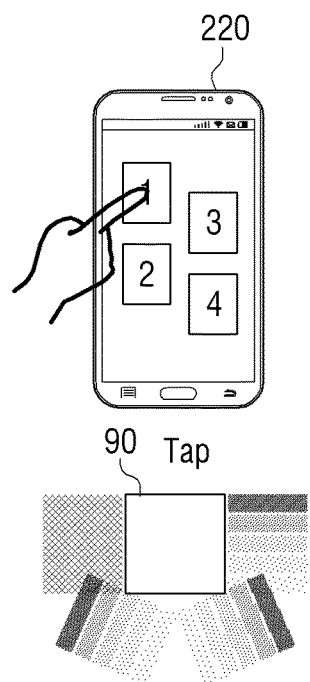
Figure 12B:
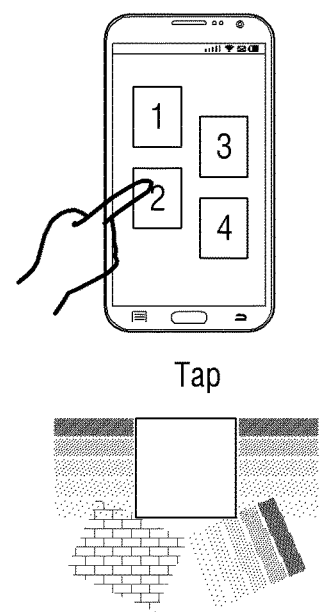
Figure 12C:
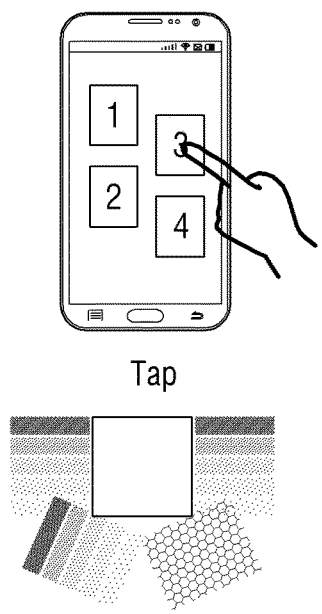
Figure 12D:
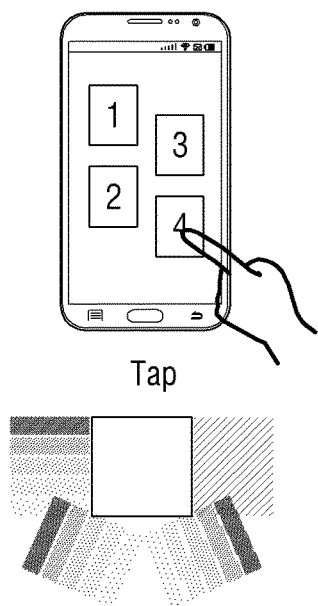
Figure 13A:
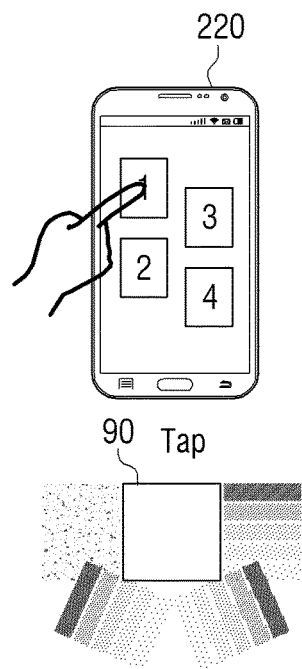
Figure 13B:
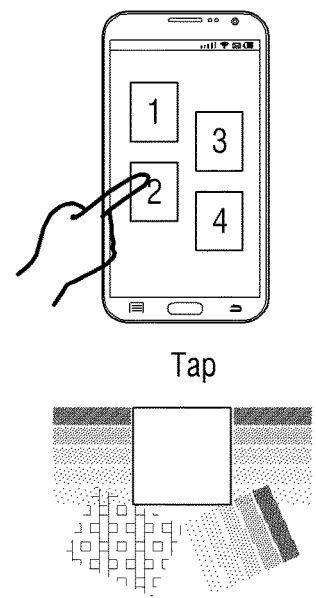
Figure 13C:
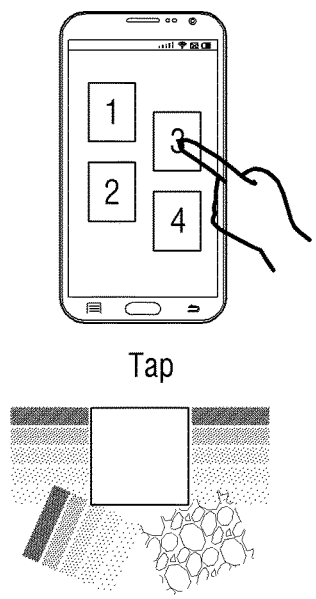
Figure 13D:
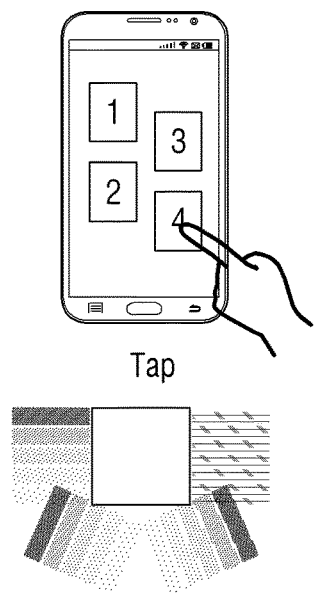

FIGS. 10A-10C are views provided to illustrate sound and lighting effects using the touchpad 121 (or drumpad) illustrated in FIG. 6A.

According to an exemplary embodiment, the audio apparatus 90 may be played by tapping several sound effects at the same time using the touchpad 121 as shown in FIG. 10A-10C. During play, the audio apparatus 90 may provide different forms of lighting effects to a lighting area corresponding to each of the pad areas 1-4. If no input is received, the audio apparatus 90 may provide a default lighting effect, allowing lighting effect to react to the music being played. FIG. 10A illustrates providing a default lighting. For example, suppose that area 1 of the touch pad 121 produces a drum sound, area 2 of the touch pad 121 produces a whistle sound, area 3 of the touch pad 121 produces a tambourine sound, and area 4 of the touch pad 121 produces a hip-hop exclamation.

Provided the above, for example, if a user touches area 1 as shown in FIG. 10B, a drum sound may be played and a lighting effect having the form of spots corresponding to the drum sound may be provided in the lighting area 1.

In addition, for example, as shown in FIG. 10C, when the sound effects are played simultaneously, lighting effect reacts to the sound effects simultaneously. When area 1 and area 3 are tapped, that is, touched, a drum sound and a tambourine sound are played every time a touch input is received, and simultaneously spots corresponding to the drum sound is provided in the lighting area 1 and a checker pattern corresponding to the tambourine sound is provided in the lighting area 3.

FIGS. 11A-11C, 12A-12D and 13A-13D are views provided to illustrate sound and lighting effects of an audio apparatus 90 using the mobile terminal apparatus 220 illustrated in FIG. 6C according to music genre.

According to an exemplary embodiment, the audio apparatus 90 may change an outputting form of a sound and lighting by a user command input to the mobile terminal 220. For example, the mobile terminal 220 may play a sound effect kit and each kit may provide four sounds. For example, the mobile terminal 220 may, with respect to a particular operation mode (e.g. Latin kit), set area 1 to agogo, area 2 to drum, area 3 to tambourine and area 4 to triangle. Provided the above, when the mobile terminal 220 is not playing, the audio apparatus 90 may provide a default lighting that interlocks with music as shown in FIG. 11A. In this example, "kit" refers to a set of multiple sounds bound to one group in the form of a program or a module, for example.

In the process, when a user of the mobile terminal 220 selects agogo, the audio apparatus 90 provides an agogo sound every time a touch input is received, and provide a lighting set with respect to the lighting area 1 corresponding to the sound effect.

In this case, when each area of a plurality of mobile terminals 220-1 to 220-3 is selected and played, a preset lighting is provided in areas that are matched with a music instrument playing each sound.

As shown in FIGS. 12A-12D, when a user plays a Latin kit, when the user selects area 1 in a screen of the mobile terminal 220, an agogo sound and a lighting preset to lighting area 1 may be provided. In addition, when the user selects area 2, a drum sound and a lighting set with respect to lighting area 2 may be provided. Likewise, when the user selects area 3, a tambourine sound and a lighting set with respect to lighting area may be provided. Further, when area 4 is selected in the screen of the mobile terminal 220, the audio apparatus 90 may provide a triangle sound and a lighting set with respect to lighting area 4.

FIG. 13 is a view illustrating a sound and lighting effects of the audio apparatus 90 when a hip-hop kit is selected as shown in FIG. 7C. In this example, when the user selects area 1 in the mobile terminal 220, the audio apparatus 90 provides the sound of "Ah-yeah" and a lighting set with respect to lighting area 1 according to a predetermined method as shown in FIG. 13A. The audio apparatus 90, as shown in each of FIG. 13B-13D, provides a beatbox sound and a lighting set with respect to lighting area 2, a scratch sound and a lighting set with respect to lighting area 3, and a shouting sound and a lighting set with respect to lighting area 4.

FIGS. 14A-14C and 15A-15D are views provided to illustrate sound and lighting effects of an audio apparatus 90 using a detector 140 as illustrated in FIG. 6B according to exemplary embodiments.

Figure 14A:
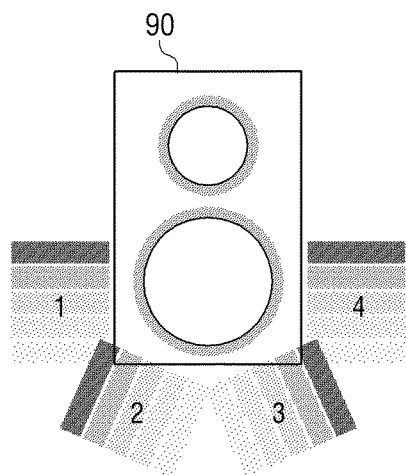
FIGS. 14A-14C and 15A-15D are views provided to illustrate sound and lighting effects of an audio apparatus using a detector as illustrated in FIG. 6B according to exemplary embodiments.

For each of the areas of the audio apparatus 90, a sound effect and a lighting effect mapped to the sound are designated. For example, a drum sound and lighting A may be designated for area 1, and a whistle sound and lighting B may be designated for area 2, and a tambourine sound and lighting C may be designated for area 3, and a hip-hop exclamation sound and lighting B may be designated for area 4 as shown in FIG. 14A.

Figure 14B:
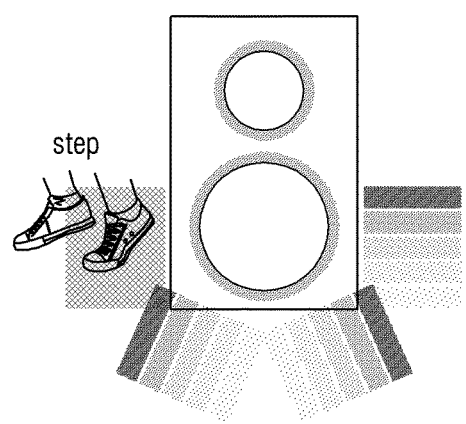

In this example, when a step motion is detected by a sensor in area 1, as shown in FIG. 14B, a drum sound is played every time a foot steps on the floor and lighting A corresponding to the drum sound may be provided in area 1 together with the sound.

Figure 14C:
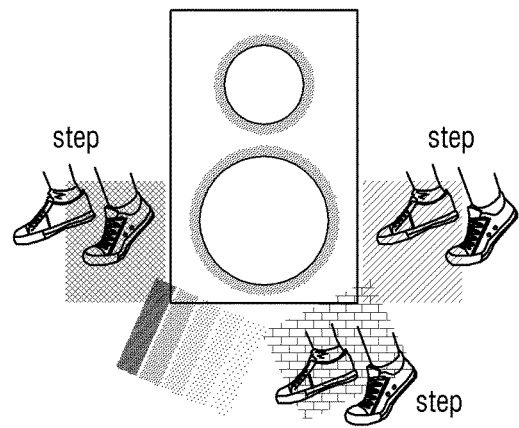

In addition, when a step motion is detected in area 1, area 3 and area 4, the audio apparatus 90 may play a drum, tambourine and hip-hop exclamation sounds to correspond to the user's step, and produce a lighting effect corresponding to each of the areas or sound as shown in FIG. 14C.

Figure 15A:
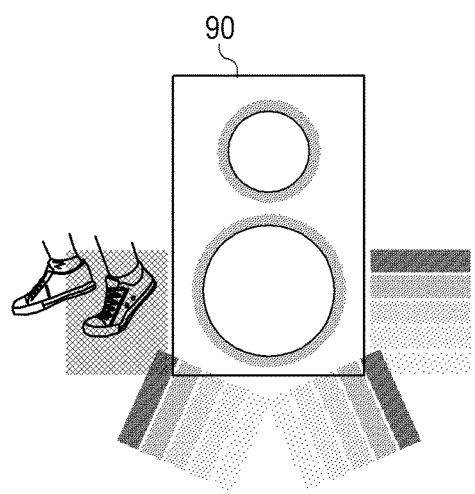
Figure 15B:
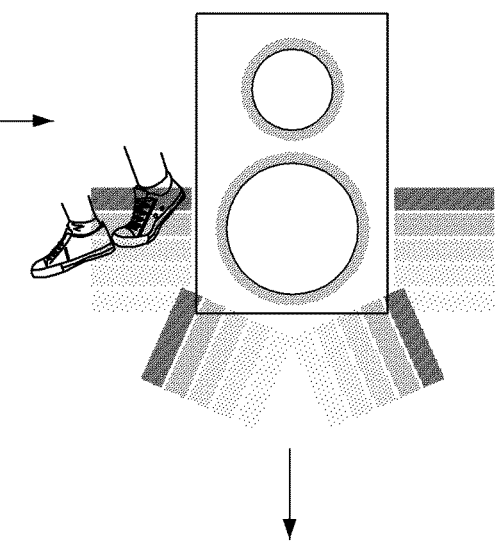

When area 1 receives a user step as shown in FIG. 15A, a drum sound is played and lighting A is provided in area 1; however, when area 1 does not receive a user step, no sound effect is provided and only a default lighting may be provided as shown in FIG. 15B. When the user moves to area 2 and taps the floor with his or her foot, a whistle sound is played and lighting B is provided in area 2 as shown in FIG. 15C.

Figure 15D:
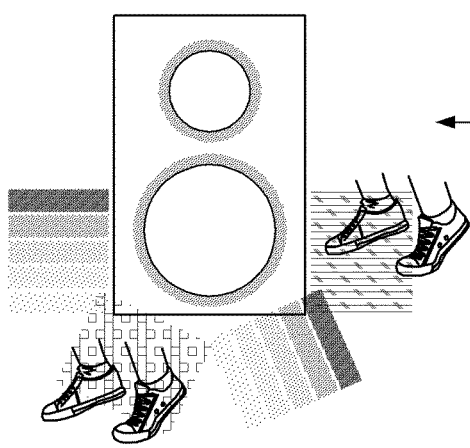
Figure 15C:
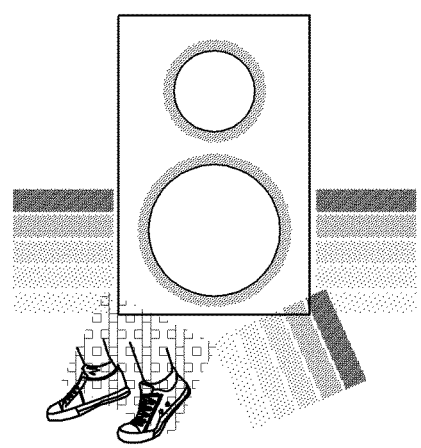

In addition, as shown in FIG. 15D, when another user/attendee, who is dancing, enters area 4 and taps the floor with his or her foot, a whistle sound and a hip-hop exclamation sound are played simultaneously and lighting of area 2 and that of area 4 may be simultaneously provided.

FIGS. 16A-16E are views provided to illustrate acoustic and lighting effects of an audio apparatus when a soccer mode is set in FIG. 7C according to an exemplary embodiment.

According to an exemplary embodiment, the audio apparatus 90 may provide a default lighting reacting to music to each area as shown in FIG. 16A. In this process, the audio apparatus 90 may make a soccer icon appear randomly in a lighting area as shown in FIGS. 16B and 16C. The example may vary according to how a system designer sets the program, for example.

As such, while a soccer icon is provided, when a user performs a kick gesture, for example, a sound effect of shouting may be provided at the time of the kick gesture. In addition, a soccer ball-shaped lighting effect may be provided in an area that received the kick as shown in FIG. 16D.

Further, the audio apparatus 90 may, in response to multiple users performing a kick gesture at the same time, provide a shouting sound effect at the time of each kick gesture. Also, a soccer ball-shaped lighting effect may be provided in each area that received the kick as shown in FIG. 16E.

FIGS. 17A-17F are views provided to illustrate a lighting control mode using a mobile terminal apparatus 220 when a drawing mode is selected in FIG. 7C according to an exemplary embodiment.

Figures 17A, 17B, 17C:
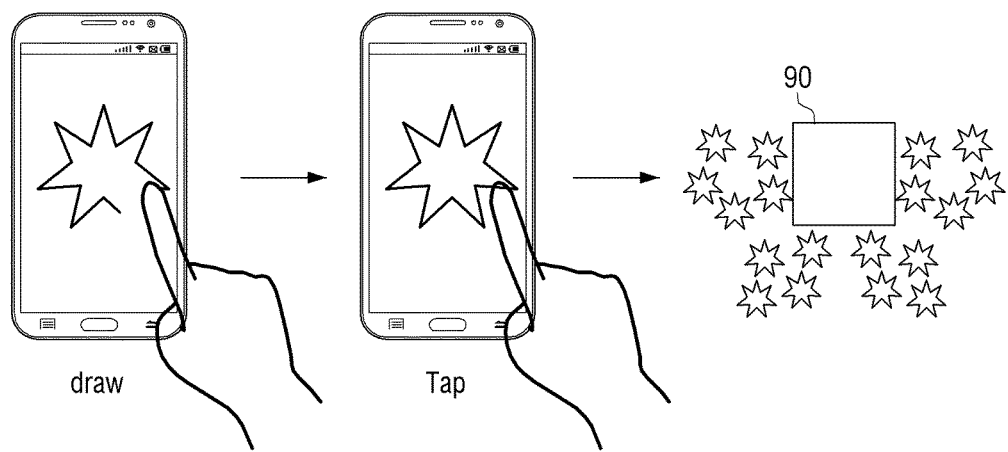

For example, when a user draws a desired shape on a screen using a mobile terminal 220 and touches (or taps) the drawn shape (or outputs a stored image of a shape on a screen and selects the outputted shape image) as shown in FIGS. 17A and 17B, a lighting is expressed in the form as shown in FIG. 17C and a lighting is provided every time a touch input is received.

Further, a desired form of lighting may be provided by a control of a plurality of mobile terminals as shown in FIGS. 17D and 17E. When multiple mobile terminals 1, 2, 3, 4 are interlocked with the audio apparatus 90 simultaneously as shown in FIGS. 17D and 17E, a lighting area is divided by n and a shape drawn in each of the mobile terminals (or the selected image of shape) may be provided as a lighting effect as shown in FIG. 17F.

Figure 18A:
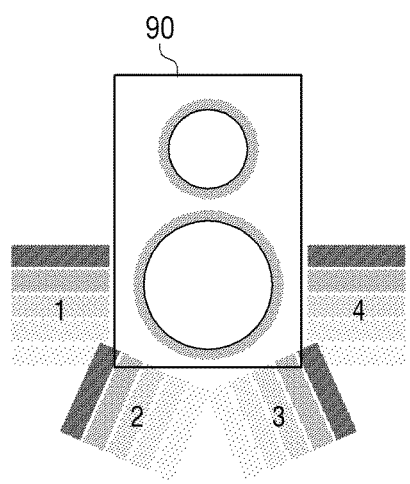
FIGS. 18A-18C are views provided to illustrate an auto volume boosting operation using a sensor according to an exemplary embodiment.
Figure 18B:
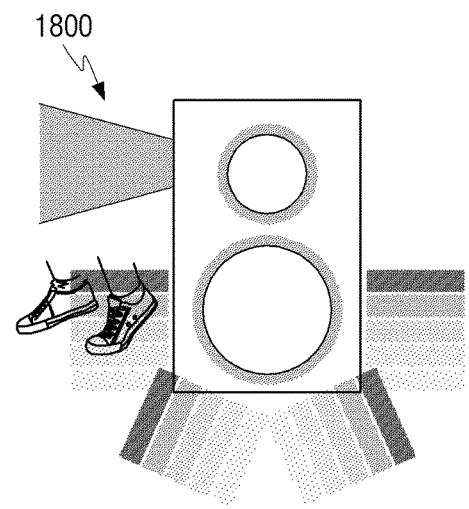
Figure 18C:
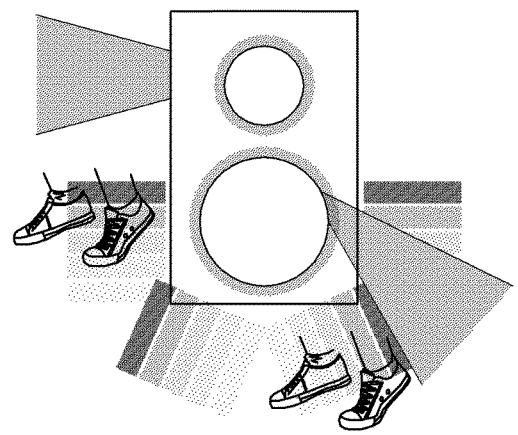

FIGS. 18A-18C are views provided to illustrate an auto volume boosting operation using a sensor according to an exemplary embodiment.

According to an exemplary embodiment, a default lighting is provided to each area of the audio apparatus 90 as shown in FIG. 18A and sensing operation, that is, detecting operation, is performed in each area.

From among lighting effects in general, when a step motion is sensed in an area 1 by a sensor, a volume boosting effect is operated as shown in FIG. 18B. In addition, additional lamp lighting 1800 may be provided in area in which the step is sensed and an effect such as a spotlight may be produced.

Further, when a step motion is sensed in area 3, the audio apparatus 90 may light additional lamp lighting 1800 in this area to provide an effect such as a spotlight as shown in FIG. 18C.

Figure 19A:
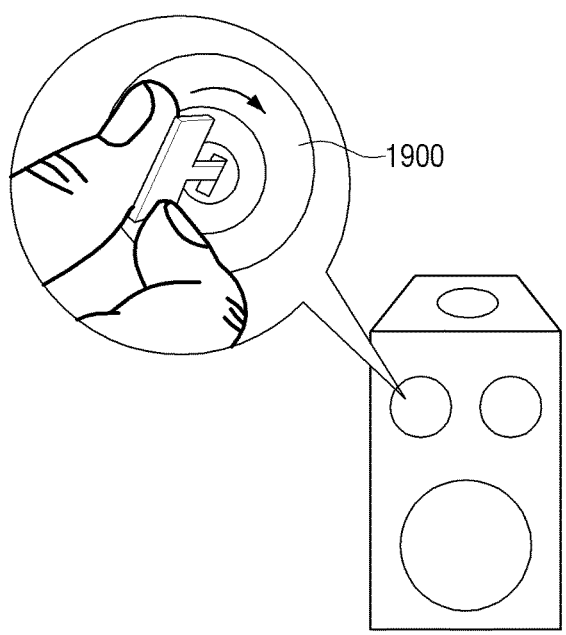
FIGS. 19A and 19B are views provided to illustrate a lighting effect in a power-on state according to an exemplary embodiment.
Figure 19B:
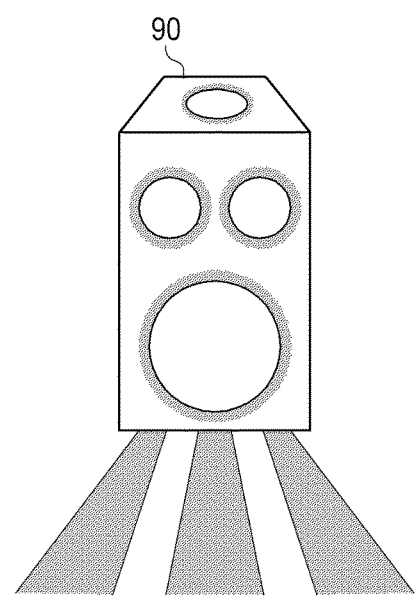

FIGS. 19A and 19B are views provided to illustrate a lighting effect in a power-on state according to an exemplary embodiment.

According to an exemplary embodiment, the audio apparatus 90 is the user interface 120 of FIG. 1B and is turned on or off by turning a power switch 1900 as if starting a vehicle shown in FIG. 19A. When the user is switched on, a main body 100 and a lighting in the peripheral area may provide a particular lighting effect indicating a power-on state as shown in FIG. 19B.

FIGS. 20A and 20B are views illustrating a lighting effect in a state where a storage medium is connected according to an exemplary embodiment.

According to an exemplary embodiment, the audio apparatus 90 includes the user interface 120 of FIG. 1B and may include a connector to which a storage medium, such as USB, may be connected as shown in FIG. 20A.

For example, when the storage medium 200 is inserted into the audio apparatus 90 which is turned off and the switch is turned, the audio apparatus 90 is turned on and may provide a particular lighting effect indicating a power-on state and simultaneously produce music of the storage medium 2000 as shown in FIG. 20B.

FIGS. 21A-21C are views provided to illustrate acoustic and lighting effects in response to selection of a function execution button according to an exemplary embodiment.

According to an exemplary embodiment, the audio apparatus 90 includes the user interface 120 of FIG. 1B and may include a function execution button 2100 as shown in FIG. 21A.

When a user presses the function execution button 2100 to execute a particular function (e.g. GIGA) to maximize a sound source volume, the sound source volume is maximized as a lighting of the main body 100 is turned on from the bottom to up as if a gauge is filled up as shown in FIGS. 21B and 21C. The user may receive visual feedback that a volume of music being played is getting louder.

Figure 22A:
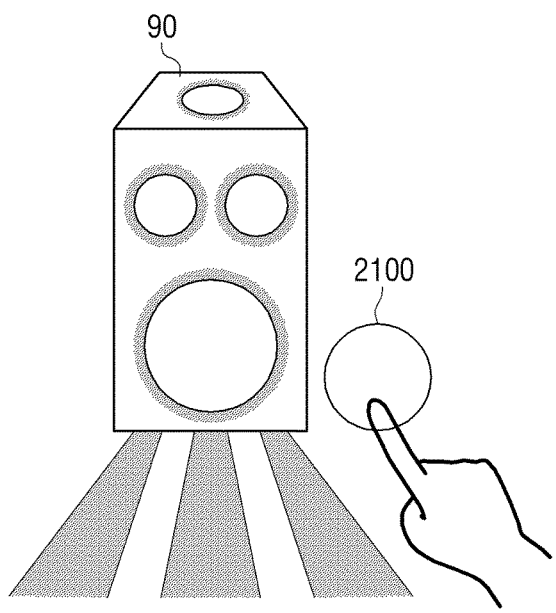
FIGS. 22A and 22B are views provided to illustrate acoustic and lighting effects when a lighting accessory is added according to an exemplary embodiment.
Figure 22B:
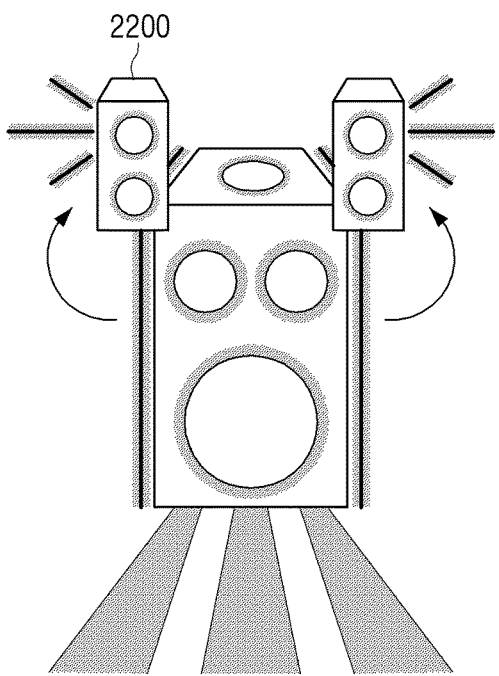

FIGS. 22A and 22B are views provided to illustrate acoustic and lighting effects when a lighting accessory is added according to an exemplary embodiment.

According to an exemplary embodiment, the audio apparatus 90 is the user interface 120 of FIG. 1B and may include a connector 2100 for connection with an accessory 2200 as shown in FIG. 22A.

As illustrated in FIG. 22B, an additional lighting accessory 2200 is additionally connected to the audio apparatus 90 to be provided according to situations and provide additional lighting effect, thereby making a party atmosphere stronger.

Figure 23:
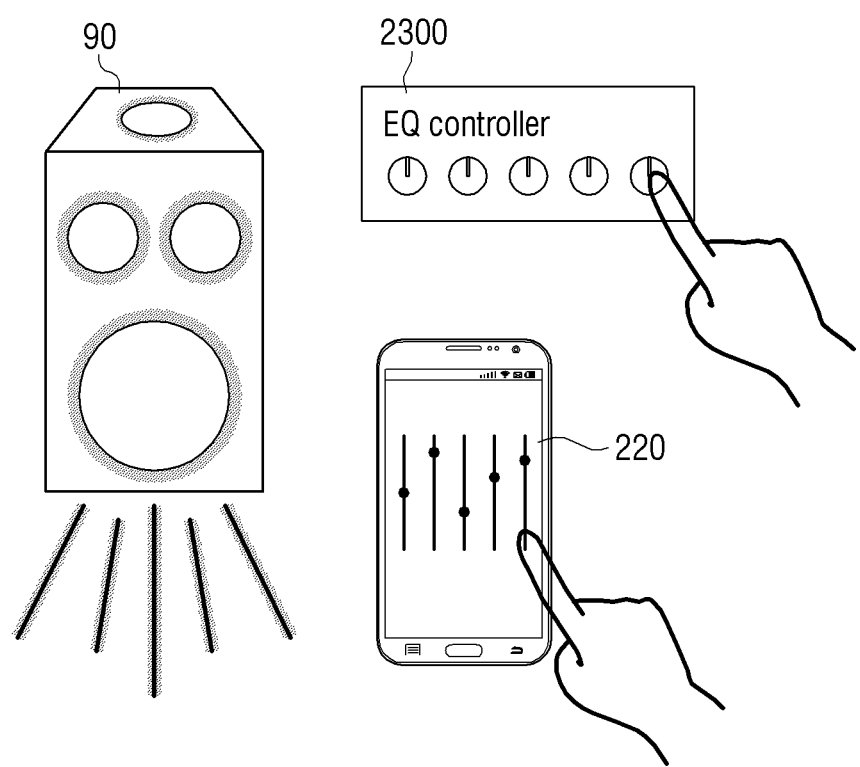
FIG. 23 is a view provided to illustrate acoustic and lighting effects in response to adjustment of an equalizer according to an exemplary embodiment.

FIG. 23 is a view provided to explain acoustic and lighting effects in response to adjustment of an equalizer.

According to an exemplary embodiment, the audio apparatus 90 includes the user interface 120 of FIG. 1 and may include an equalizer control lever 2300. Also, the equalizer function of the audio apparatus 90 may be controlled by the mobile terminal 220 illustrate in FIG. 2.

When an equalizer setting is changed or each numerical value is changed, the audio apparatus 90 may transform a changed EQ value into a visualized image and provide a lighting to a peripheral area of the audio apparatus 90. Thereby, the audio apparatus 90 may provide clear feedback and entertainment.

FIGS. 24A and 24B are views provided to illustrate acoustic and lighting effects using a touchpad according to an exemplary embodiment.

According to an exemplary embodiment, the audio apparatus 90 includes the user interface 120 of FIG. 1B and may include a function execution button 121 (or a touch pad 121). In this example, the touchpad 121 is a physical user interface (PUI). In addition, the audio apparatus 90 may be controlled by touching a touchpad displayed on a screen of the mobile terminal 220.

When multiple instrument sounds and multiple sounds are selected in one pad, the audio apparatus 90 may transmit sound every time the selection is made. In the exemplary embodiment, the audio apparatus 90 may provide a lighting effect matched with a sound effect. A different shape or a different color of lighting effect may be provided according to which sound effect is selected.

Figure 25:
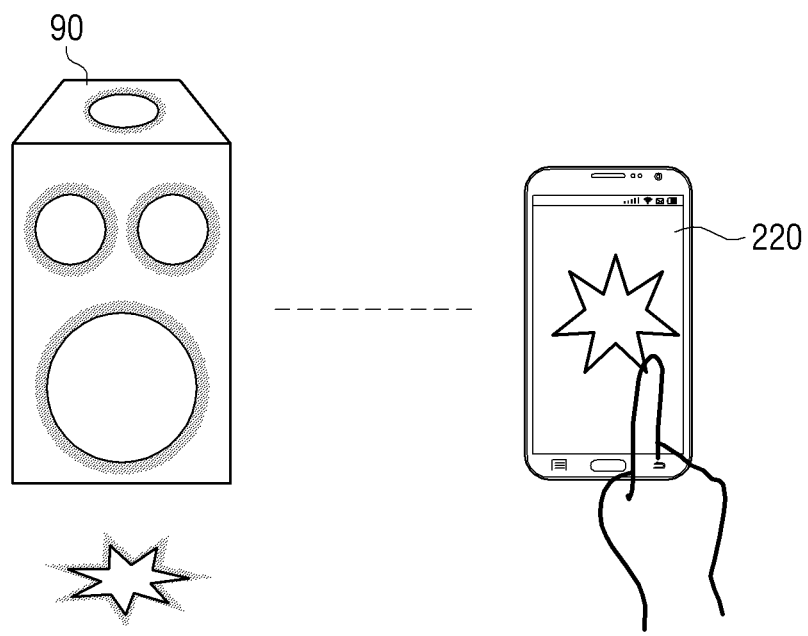
FIGS. 25, 26A and 26B are views illustrating schematic representations of embodiments shown in FIGS. 17A-17C and 17D-17F.
Figure 26B:
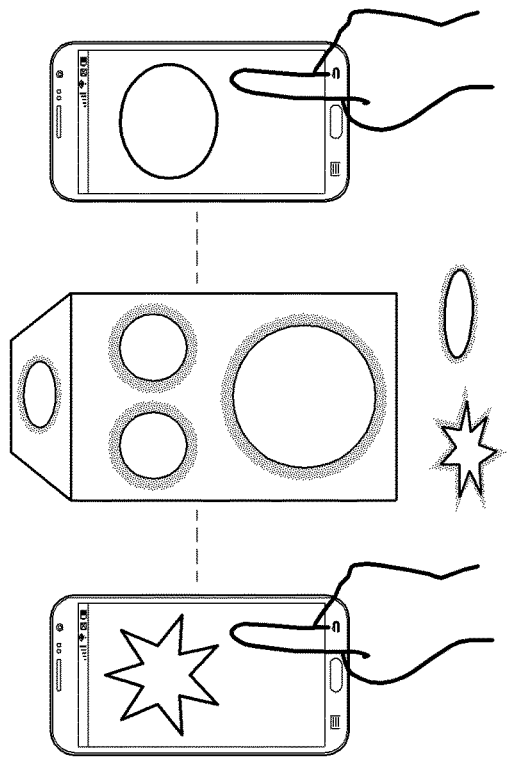
Figure 26A:
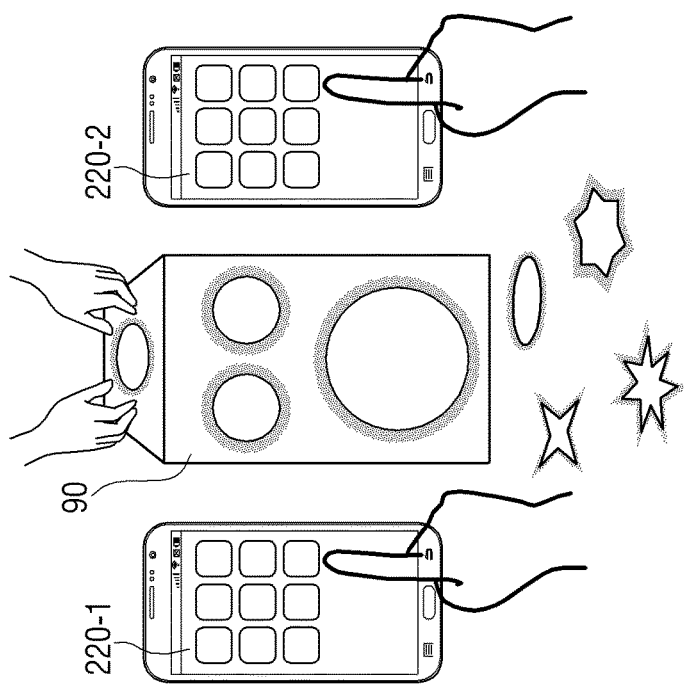

FIGS. 25, 26A and 26B are views illustrating schematic representations of embodiments shown in FIGS. 17A-17C and 17D-17F.

According to exemplary embodiments, an image either selected from or drawn in the mobile terminal 220, which operates as a controller, may be expressed as a lighting effect of the audio apparatus 90 as shown in FIG. 25. The audio apparatus 90 may use a shape-drawing function and output an image of a shape pre-stored in a screen to execute all selected functions.

In addition, as shown in FIGS. 26A and 26B, a plurality of mobile terminals 220-1, 220-2 may be connected to the audio apparatus 90 so that multiple users may simultaneously control playing of instruments, sound effect and lighting effect. When the audio apparatus 90 is in a mode which provides a sound source effect, a predetermined lighting effect is provided according to a selected sound source effect, and when the audio apparatus 90 is in a mode which provides a lighting effect, an image selected or drawn by a user may be provided as a lighting effect.

FIGS. 27A, 27B, 28A and 28B are views provided to illustrate acoustic and lighting effects using a controller according to exemplary embodiments.

Figure 27A:
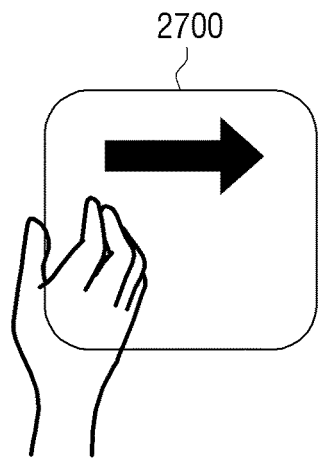
FIGS. 27A, 27B, 28A and 28B are views provided to illustrate acoustic and lighting effects using a controller according to exemplary embodiments.
Figure 27B:
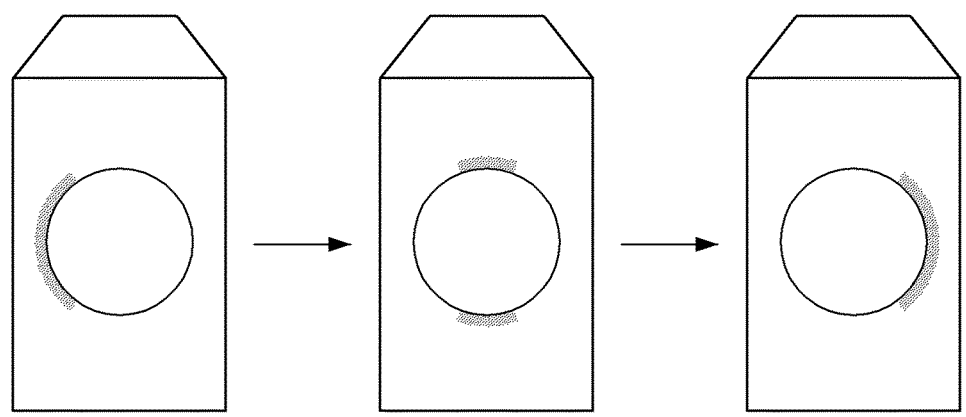
Figure 28A:
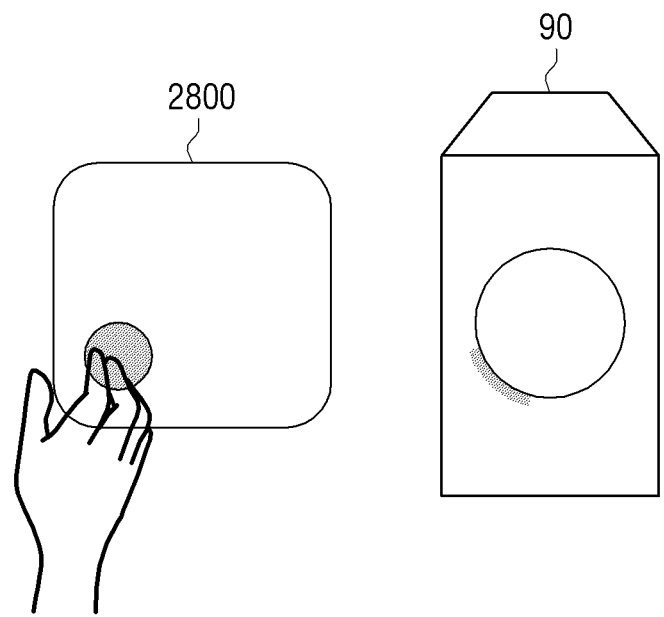
Figure 28B:
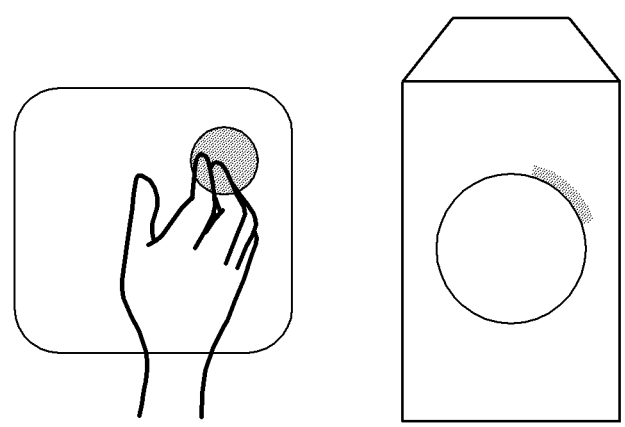

According to an exemplary embodiment, the audio apparatus 90 is controlled by a sensor, a touchpad (or drumpad) 121, and a mobile terminal 220 which are operated as a controller 2700, 2800 shown in FIG. 27A and FIG. 28A. In addition, as shown in FIGS. 27B and 28B, when a function is executed, a lighting effect may react with a movement in the same direction as a direction of gesture, a location of touch input, and a symbolic orientation of the function. In this example, the term "symbolic orientation" may be understood to refer to a particular direction when the direction is within an error range or setting a representative direction when multiple directions are input.

Figure 29A:
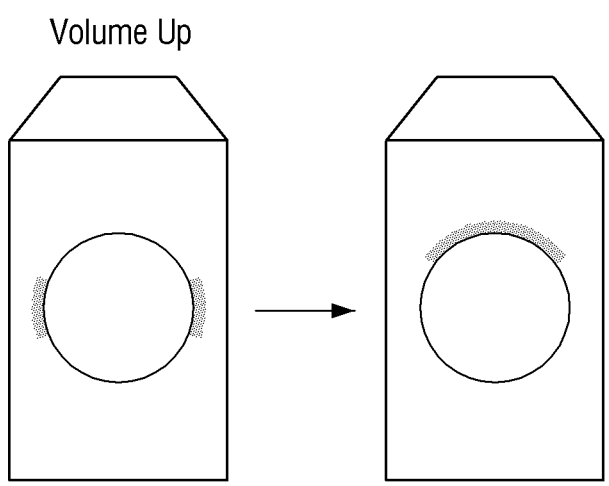
FIGS. 29A and 29B are views provided to illustrate acoustic effects based on a surrounding circumstance of an audio apparatus according to an exemplary embodiment.
Figure 29B:
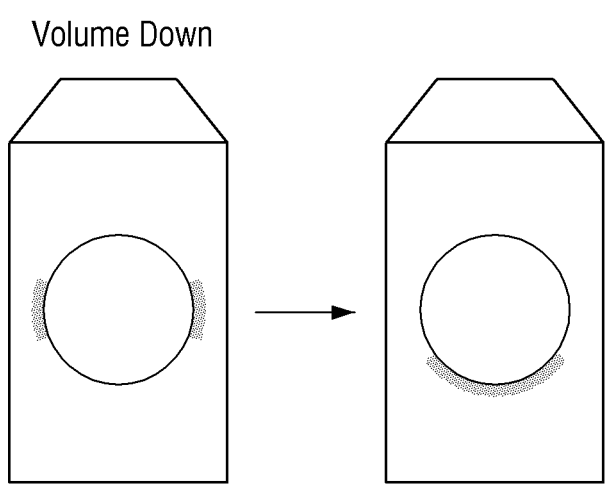

FIGS. 29A and 29B are views provided to illustrate acoustic effects based on a surrounding circumstance of an audio apparatus according to an exemplary embodiment.

According to an exemplary embodiment, the audio apparatus 90 may recognize an motion of a user in a peripheral area, and according to the recognition result, increase or reduce a volume as shown in FIGS. 29A and 29B.

Figure 30:
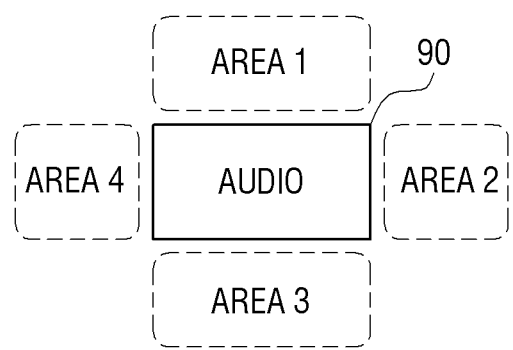
FIG. 30 is a view provided to explain a peripheral area of an audio apparatus.
Figure 31A:
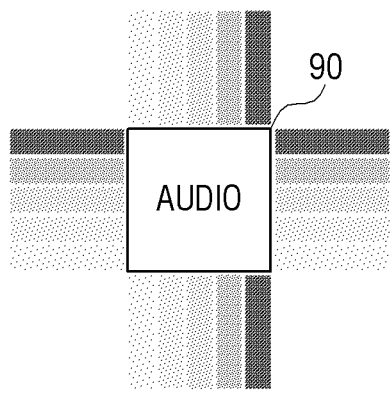
FIGS. 31A, 31B and 32 are views illustrating a lighting effect when a user is detected in each area according to exemplary embodiments.
Figure 31B:
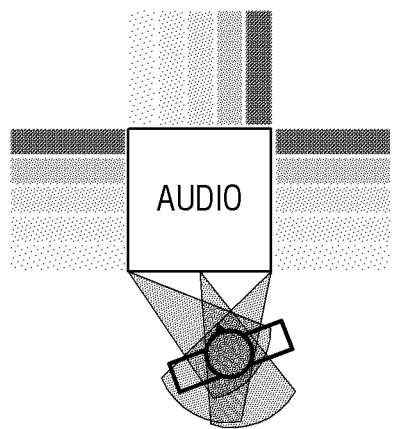
Figure 32:
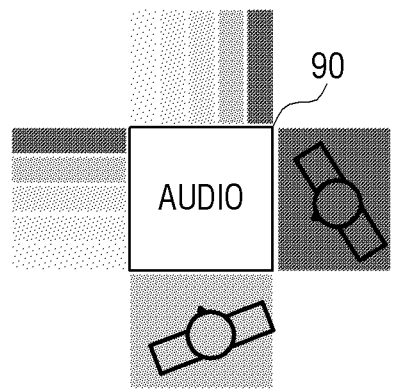

FIG. 30 is a view provided to explain a peripheral area of an audio apparatus 90 and FIGS. 31A, 31B and 32 are views illustrating a lighting effect when a user is detected in each area according to exemplary embodiments.

According to an exemplary embodiment, the audio apparatus 90 may be surrounded by users at, for example, a party. In the exemplary embodiment, a user motion may be detected from four directions around the audio apparatus 90.

Each of the areas of the audio apparatus 90 may, as shown in FIG. 1, include a detector 140 for recognizing whether a user/attendee is present and if the user/attendee is determined to be present, the detector 140 may determine what action is performed by the detected user/attendee.

According to the above-mentioned feature, the audio apparatus 90 may, when music is played, provide a default lighting in all the areas of FIG. 30 as shown in FIG. 31A.

In this process, while a user approaches to area 3 of FIG. 30, for example, when a foot motion of dancing is recognized while the music is playing, the audio apparatus 90 changes its mode to Giga sound mode as shown in FIG. 31B, and provide a special lighting effect provide a spotlight to a place where the foot motion is recognized.

In addition, a lighting effect may be separately provided according to the number of persons (user/attendee) surrounding the audio apparatus 90 as shown in FIG. 32. A lighting effect may react to a step of each of the recognized persons and a speed or elaboration of the effect may differ according to a speed of the step and a size of the movement. All of such motions may be performed according to an analysis of an audio signal detected from the audio apparatus 90 and thus, the detailed description will be omitted herein.

Figure 33A:
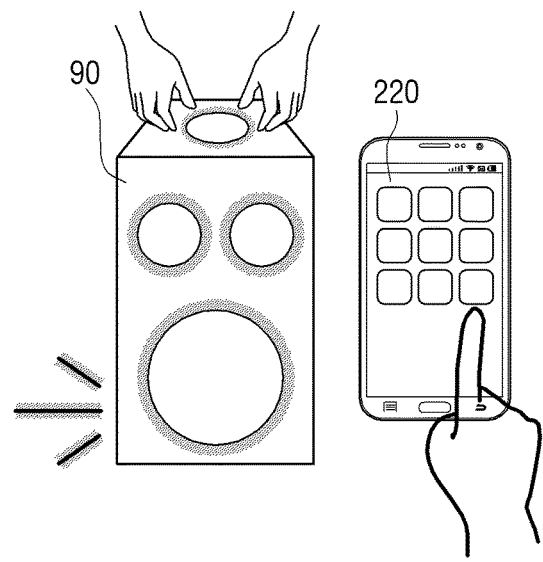
FIGS. 33A, 33B and 34 are views illustrating schematic representations of FIGS. 14A-14C, 15A-15D and 16A-16E.
Figure 33B:
Figure 34:
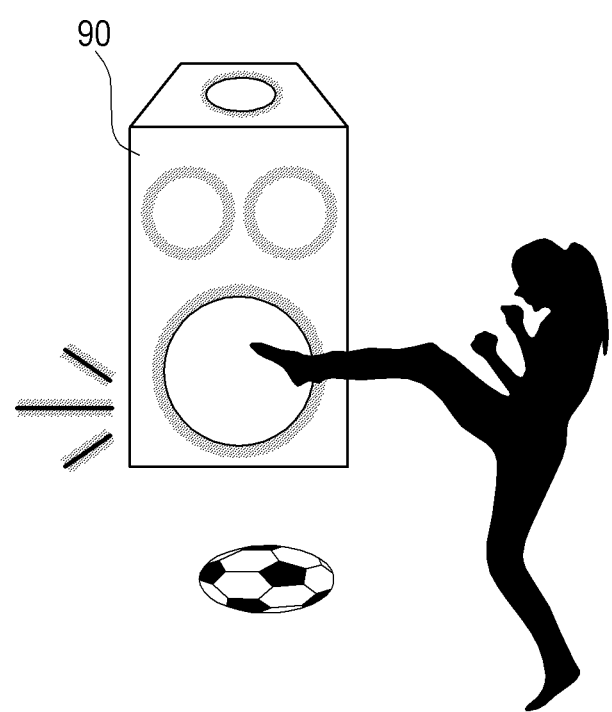

FIGS. 33A, 33B and 34 are views illustrating schematic representations of embodiments shown in FIGS. 14A-14C, 15A-15D and 16A-16E.

According to an exemplary embodiment, in the state that the audio apparatus 90 enters a mode which provides a sound effect, the audio apparatus 90 may, because a sound effect and an instrument sound are designated in each of the peripheral areas of the audio apparatus 90 (e.g. the sounds may be set by a user or it may be provided in a predetermined form), in response to a user dancing in an area, provide a sound effect according to steps, and provide a lighting effect predetermined with respect to each sound effect to a peripheral area of the audio apparatus 90. The sensing of foot motion has been described in detail with reference to FIGS. 14A-14C and 15A-15D, and thus the description will be omitted herein.

Further, as shown in FIG. 34, while a lighting which symbolizes a particular sound effect is provided, when a kick gesture is received, a sound effect corresponding to the kick gesture is provided. For example, while a soccer ball image is provided, when a kick gesture is received, a whistle sound and a shouting sound may be provided. It has been described in detail with reference to FIG. 16 and thus, the description will be omitted herein.

According to an exemplary embodiment, a user may be provided with a fun factor and convenience from a power button using a vehicle starting metaphor and a USB immediate play.

In addition, because a function of controlling a sound or a lighting effect by using multiple terminals, that is, mobile terminals, or by recognizing a number of persons near an apparatus may be used by many people, many people would enjoy a party spirit at a party where the apparatus is commonly used.

Further, an operation provided by VFD and feedback for a state of an apparatus may be provided through a lighting of a main body and a lighting of a peripheral area of the apparatus, thereby providing more clear feedback and improving the usability.

Moreover, it is even convenient in controlling an effect only by an operation of dancing at a party rather than manually by hand.

Figure 35:
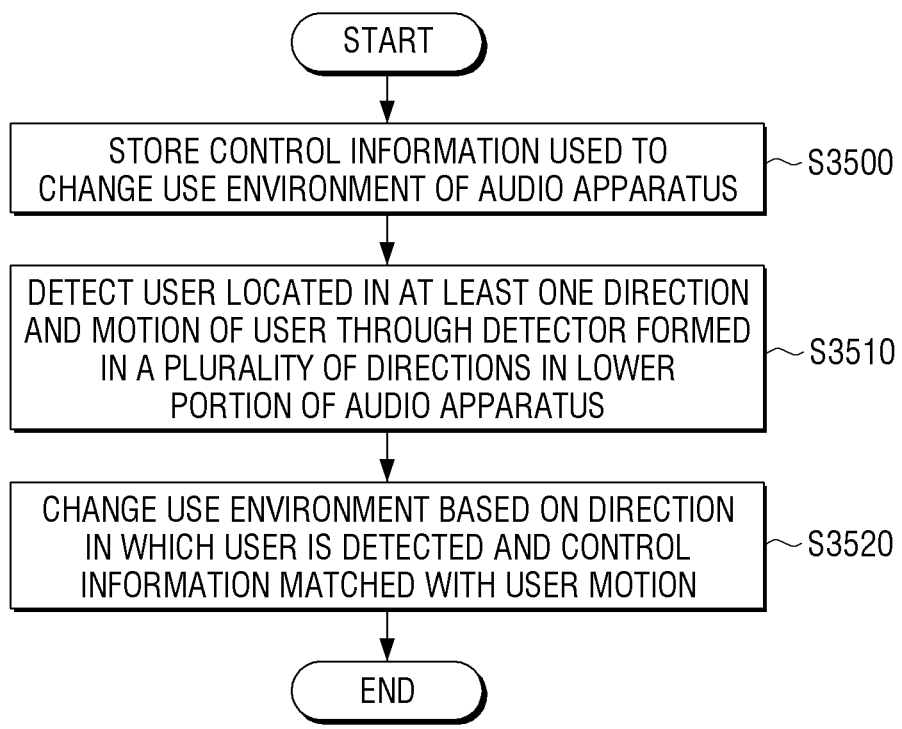
FIG. 35 is a flowchart showing a process of driving an audio apparatus according to an exemplary embodiment.

FIG. 35 is a flowchart showing a process of driving an audio apparatus according to an exemplary embodiment.

Referring to FIG. 35 together with FIGS. 1A and 1B, the audio apparatus 90 illustrated in FIG. 1A may store control information used to change a use environment around the audio apparatus 90, that is, a surrounding atmosphere, of the audio apparatus 90, at step S3500.

Then, the audio apparatus 90 may detect a user located in at least one direction (with respect to the audio apparatus 90) and a motion of the user through a detector formed in a plurality of directions in a lower portion of the audio apparatus 90, at step S3510. In this example, a controller of the audio apparatus 90 may recognize a direction in which the user is detected and the user's motion by a detection signal. For example, the detector may have apparatus information (e.g. ID), and the controller may, in response to the corresponding apparatus information being received from the detector, recognize a direction in which the user is located. In addition, the controller may recognize the user motion by analyzing the detection signal received from the detector.

Then, the audio apparatus 90 may change a use environment of the audio apparatus 90 based on the direction in which the user is detected and the stored control information matched with the user motion, at step S3520.

Figure 36:
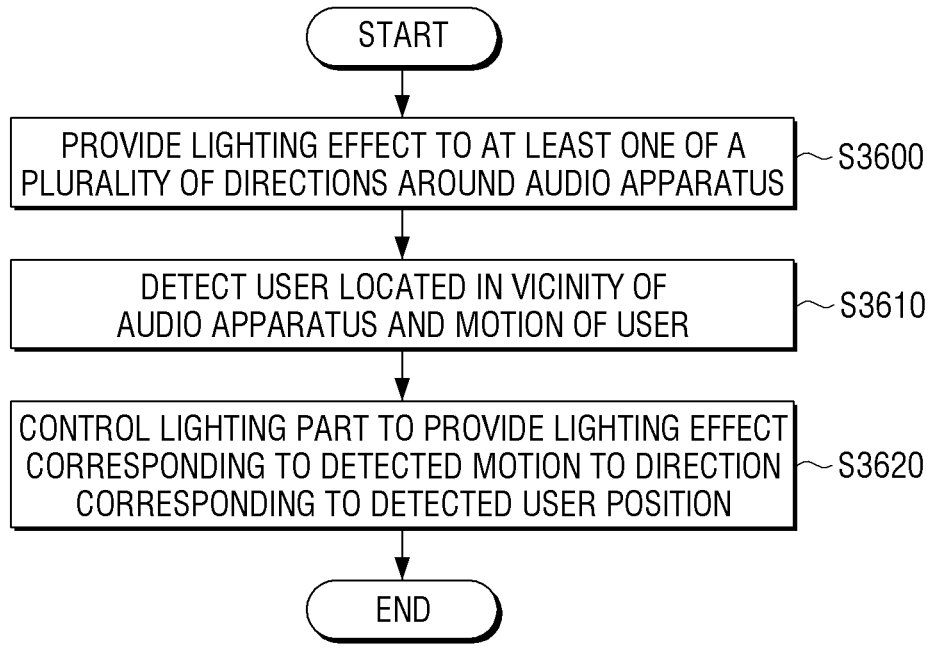
FIG. 36 is a flowchart showing a process of driving an audio apparatus according to an exemplary embodiment.

FIG. 36 is a flowchart showing a process of driving an audio apparatus according to an exemplary embodiment.

Referring to FIG. 36 together with FIG. 1 for convenience of explanation, the audio apparatus 90 illustrated in FIG. 1 may provide a lighting effect to at least one of a plurality of directions (provide a lighting effect to at least one of a plurality of areas surrounding the audio apparatus 90) around the audio apparatus, at step S3600. In this example, a lighting effect may be a lighting that has been set as default.

In addition, the audio apparatus 90 may detect a user located in the vicinity of the audio apparatus 90 and a motion of the user, at step S3610. In this example, the motion may be a kick gesture, jumping, and the like.

In addition, the audio apparatus 90 may provide a lighting effect corresponding to a detected motion to a direction corresponding to the detected position of the user, at step S3620. For this purpose, the audio apparatus 90 may provide a lighting part which provides a lighting effect.

The above description takes a party place for example with reference to many drawings; however, the example may be advantageously used in many other places as well, such as a house, an office, and the like. Accordingly, the present disclosure will not be limited to a party place.

Although it has been described above that all of the elements constituting the exemplary embodiments of the present disclosure are combined or combined to operate, the present disclosure is not limited to those exemplary embodiments only. That is, within the scope of purpose of the present disclosure, all of the elements may be selectively combined into two or more elements to operate. In addition, although all of the elements may respectively be realized as one independent hardware, some or all of the elements may be selectively combined to be realized as a computer program having a program module which performs some or all of the functions formed from a combination of one or more hardware. Codes and code segments constituting the computer program would be easily derived by those skilled in the art. Such computer program may be stored in a non-transitory computer readable media, and read and executed by a computer to realize the exemplary embodiments of the present disclosure.

The non-transitory computer readable recording medium indicates a medium which stores data semi-permanently and can be read by devices, rather than a medium storing data temporarily, such as register, cache, or memory. Specifically, the above-described programs may be stored in a non-transitory computer readable medium such as a compact disc (CD), a digital versatile disk (DVD), a hard disk, a Blu-ray disk, a universal serial bus (USB), a memory card, and a read only memory (ROM), and may be provided.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An audio apparatus, comprising:
a plurality of lighting parts configured to provide a lighting effect in a plurality of directions around the audio apparatus, the plurality of lighting parts provided on the audio apparatus;
a detector configured to detect a direction, with respect to the audio apparatus, of at least one person present in a vicinity of the audio apparatus;
an acoustic outputting part configured to provide sound effect; and
a processor configured to control at least one lighting part among the plurality of lighting parts provided on the audio apparatus to provide the lighting effect based on the direction of the at least one person,
wherein the at least one lighting part is configured to provide the lighting effect corresponding to the sound effect.

2. The apparatus as claimed in claim 1, wherein the detector comprises at least one of a proximity sensor, a vibration sensor, a microphone and a camera.

3. The apparatus as claimed in claim 1, further comprising:
a user interface configured to receive a user command to manually control the plurality of lighting parts,
wherein the user interface includes a touch pad configured to receive the user command input through a plurality of sensing areas on the user interface matched with the plurality of directions around the audio apparatus.

4. The apparatus as claimed in claim 1, further comprising:
a communication interface configured to communicate with a mobile terminal device and configured to receive a user command for manually controlling the plurality of lighting parts,
wherein the communication interface is configured to receive the user command input through a plurality of sensing areas on a screen of the mobile terminal device matched with the plurality of directions around the audio apparatus.

5. The apparatus as claimed in claim 4, wherein the processor is configured to control the at least one lighting part to provide the lighting effect according to a lighting effect mode selected on the screen of the mobile terminal device.

6. The apparatus as claimed in claim 4, wherein the communication interface is configured to receive, from a plurality of mobile terminal apparatuses, a plurality of user commands for manually controlling the plurality of lighting parts, and
wherein the processor is configured to control the plurality of lighting parts to provide the lighting effect based on the plurality of received user commands.

7. The apparatus as claimed in claim 1, wherein the detector is detachable from the audio apparatus,
wherein the apparatus further comprises a user interface to which the detached detector is connected.

8. The apparatus as claimed in claim 1, further comprising:
a spotlight part included in the audio apparatus,
wherein the spotlight part provides spotlight to the detected direction.

9. The apparatus as claimed in claim 1, wherein the detector detect a motion of the at least one person,
wherein the processor is configured to control the at least one lighting part to provide the lighting effect based on the detected motion.

10. A method for driving an audio apparatus, the method comprising:
providing a lighting effect, by a plurality of lighting parts, in a plurality of directions around the audio apparatus, the plurality of lighting parts disposed on the audio apparatus;
detecting a direction, by a detector, with respect to the audio apparatus, of at least one person present in a vicinity of the audio apparatus;
providing, by an acoustic outputting part, sound effect; and
controlling, by a processor, at least one lighting part among the plurality of lighting parts disposed on the audio apparatus to provide the lighting effect based on the direction of the at least one person,
wherein the controlling the at least one lighting part comprises providing the lighting effect corresponding to the sound effect.

11. The method as claimed in claim 10, wherein the detecting comprises detecting using at least one of a proximity sensor, a vibration sensor, a microphone and a camera.

12. The method as claimed in claim 10, further comprising:
receiving, via a user interface, a user command to manually control the lighting effect,
wherein the receiving the user command comprises receiving the user command input through a plurality of sensing areas provided on the user interface matched with the plurality of directions around the audio apparatus.

13. The method as claimed in claim 10, further comprising:
- communicating, via a communication interface, with a mobile terminal device to receive a user command for manually controlling the lighting effect,
- wherein the communicating comprises receiving the user command input through a plurality of sensing areas provided on a screen of the mobile terminal device matched with a plurality of directions around the audio apparatus.

14. The method as claimed in claim 13, wherein the controlling the at least one lighting part to provide the lighting effect comprises controlling to provide the lighting effect according to a lighting effect mode selected on the screen of the mobile terminal device.

15. The method as claimed in claim 13, further comprising:
- receiving, from a plurality of mobile terminal apparatuses, a plurality of user commands for manually controlling the lighting effect,
- wherein the controlling the lighting effect to provide the lighting effect comprises controlling to provide the lighting effect based on the plurality of received user commands.

16. The method as claimed in claim 10, further comprising:
- providing, via a spotlight part, a spotlight to the detected direction, the spotlight part included in the audio apparatus.

17. The method as claimed in claim 10, wherein the detecting comprises detecting a motion of the at least one person,
- wherein the controlling comprises controlling the at least one lighting part to provide the lighting effect based on the detected motion.

18. A non-transitory computer-readable recording medium including a program for executing a method for driving an audio apparatus,
- wherein the method for driving the audio apparatus comprises:
  - providing a lighting effect, by a plurality of lighting parts, in a plurality of directions around the audio apparatus, the plurality of lighting parts disposed on the audio apparatus;
  - detecting a direction, by a detector, with respect to the audio apparatus, of at least one person present in a vicinity of the audio apparatus;
  - providing, by an acoustic outputting part, sound effect; and
  - controlling, by a processor, at least one lighting part among the plurality of lighting parts disposed on the audio apparatus to provide the lighting effect based on the direction of the at least one person,
- wherein the controlling the at least one lighting part comprises providing the lighting effect corresponding to the sound effect.

* * * * *